United States Patent
Jackson et al.

(10) Patent No.: US 11,718,320 B1
(45) Date of Patent: Aug. 8, 2023

(54) USING TRANSMISSION SENSOR(S) IN LOCALIZATION OF AN AUTONOMOUS VEHICLE

(71) Applicant: Aurora Innovation, Inc., Palo Alto, CA (US)

(72) Inventors: James Scott Jackson, Sunnyvale, CA (US); Abhay Vardhan, Redwood City, CA (US); Adam Richard Williams, San Francisco, CA (US); Yekeun Jeong, Sunnyvale, CA (US); Ethan Eade, Pittsburgh, PA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 320 days.

(21) Appl. No.: 17/125,163

(22) Filed: Dec. 17, 2020

Related U.S. Application Data

(60) Provisional application No. 63/068,511, filed on Aug. 21, 2020.

(51) Int. Cl.
*B60W 60/00* (2020.01)
*B60W 50/02* (2012.01)

(52) U.S. Cl.
CPC .... *B60W 60/0015* (2020.02); *B60W 50/0205* (2013.01); *B60W 2510/10* (2013.01); *B60W 2510/20* (2013.01)

(58) Field of Classification Search
CPC combination set(s) only.
See application file for complete search history.

(56) References Cited

U.S. PATENT DOCUMENTS

| | | | |
|---|---|---|---|
| 8,922,426 B1* | 12/2014 | Smith | G01S 19/396 342/357.23 |
| 10,776,948 B1 | 9/2020 | Parisotto et al. | |

(Continued)

FOREIGN PATENT DOCUMENTS

| | | |
|---|---|---|
| CN | 103777220 | 5/2014 |
| FR | 2988201 | 9/2013 |

(Continued)

OTHER PUBLICATIONS

Borenstein et al., "Where am I? Sensors and Methods for Mobile Robot Positioning", University of Michigan, Apr. 1996. (Year: 1996).*

(Continued)

*Primary Examiner* — Anne Marie Antonucci
*Assistant Examiner* — Amelia Vorce
(74) *Attorney, Agent, or Firm* — Gray Ice Higdon

(57) ABSTRACT

Systems and methods for using transmission sensor(s) in localization of an autonomous vehicle ("AV") are described herein. Some implementations receive instance(s) of transmission sensor data generated by transmission sensor(s) of the AV, generate pose instance(s) of a pose of the AV based on the instance(s) of the transmission sensor data, and cause the AV to be controlled based on the pose instance(s). In some of those implementations, the pose instance(s) can be generated based on steering data the AV that indicates steering angle(s) of the autonomous, and that temporally correspond to the instance(s) of the transmission sensor data. In various implementations, the pose instance(s) may only be generated or utilized based on the instance(s) of the transmission sensor data (and optionally the steering data) in response to detecting an adverse event at the AV.

14 Claims, 6 Drawing Sheets

(56) References Cited

U.S. PATENT DOCUMENTS

| | | | | |
|---|---|---|---|---|
| 2013/0141547 | A1* | 6/2013 | Shimizu | G06T 3/4038 |
| | | | | 348/48 |
| 2016/0209511 | A1* | 7/2016 | Dolinar | G06V 20/588 |
| 2017/0176989 | A1* | 6/2017 | Hay | G05D 1/0278 |
| 2018/0037136 | A1* | 2/2018 | Nelson | B60L 50/53 |
| 2018/0144621 | A1* | 5/2018 | Arai | G08G 1/0133 |
| 2018/0339703 | A1* | 11/2018 | Nix | B60W 10/04 |
| 2018/0354552 | A1* | 12/2018 | Sassa | B62D 6/10 |
| 2019/0051056 | A1 | 2/2019 | Chiu | |
| 2019/0138000 | A1 | 5/2019 | Hammond et al. | |
| 2020/0003861 | A1* | 1/2020 | Eriksson | G01S 13/878 |
| 2020/0004266 | A1 | 1/2020 | Eoh | |
| 2020/0264258 | A1 | 8/2020 | Zhang | |
| 2020/0361483 | A1* | 11/2020 | Yonushonis | B60W 30/0956 |
| 2021/0114625 | A1* | 4/2021 | Liu | B60W 60/0015 |
| 2021/0165110 | A1* | 6/2021 | Neely | H04W 4/44 |
| 2021/0197815 | A1* | 7/2021 | Pitzer | B60W 40/10 |
| 2021/0223788 | A1* | 7/2021 | Garcia | B60W 60/0057 |
| 2021/0232151 | A1* | 7/2021 | Liu | G06T 7/70 |
| 2021/0276577 | A1* | 9/2021 | Adams | B60W 60/00186 |
| 2022/0137238 | A1* | 5/2022 | Ewert | B60W 40/10 |
| | | | | 701/472 |

FOREIGN PATENT DOCUMENTS

| | | |
|---|---|---|
| WO | 2017079219 | 5/2017 |
| WO | 2022051263 | 3/2022 |

OTHER PUBLICATIONS

Liu et al., "Method for Adaptive Robust Four-Wheel Localization and Application in Automatic Parking Systems", IEEE Sensors Journal, vol. 19, No. 22, Nov. 15, 2019. (Year: 2019).*

Conner et al., "Improved dead reckoning using caster wheel sensing on a differentially steered 3-wheeled autonomous vehicle", Virginia Tech. May 2000. (Year: 2000).*

Toledo et al.; Improving Odometric Accuracy for an Autonomous Electric Cart, MDPI, Jan. 12, 2018, 15 pages.

Badue et al.; Self-Driving Cars: A Survey, Oct. 2, 2019, 34 pages.

Yi et al.; Metrics for the Evaluation of localisation Robustness, Apr. 18, 2019, 7 pages.

Meng et al; A Robust Vehicle Localization Approach Based on GNSS/IMU/DMI/LiDAR Sensor Fusion for Autonomous Vehicles, Sep. 18, 2017, 19 pages.

Thrun et al., "Probabilistic Robotics", Chapter 4.2, 492 pages.

Behley, J., & Stachniss, C. Efficient Surfel-Based SLAM Using 3D Laser Range Data in Urban Environments. Robotics: Science and Systems; (vol. 2018), 10 pages.

Demantke J., Mallet C., David N. and Vallet B., Dimensionality Based Scale Selection in 3D Lidar Point Cloud. The International Archives of the Photogrammetry, Remote Sensing and Spatial Information Sciences, XXXVIII-5/W12, 97-102, 2011, 6 pages.

United States Patent and Trademark Office, Office Action issued in U.S. Appl. No. 17/124,070 dated Jul. 21, 2022, 46 pages.

* cited by examiner

USING TRANSMISSION SENSOR(S) IN LOCALIZATION OF AN AUTONOMOUS VEHICLE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

The present disclosure is directed to particular method(s) or architecture(s) for localization of an autonomous vehicle (i.e., localization of the autonomous vehicle being autonomously controlled). Localization of the autonomous vehicle generally references determining a pose of the autonomous vehicle within its surrounding environment, and generally with respect to a particular frame of reference. Some implementations receive transmission sensor data instance(s) of transmission sensor data generated by transmission sensor(s) of the autonomous vehicle, generate pose instance(s) of a pose of the autonomous vehicle based on the transmission sensor data instance(s), and cause the autonomous vehicle to be controlled based on the generated pose instance(s). The pose instance(s) may optionally be further generated based on steering data of the autonomous vehicle that indicate steering angle(s) of the autonomous vehicle, and that temporally correspond to a corresponding one of transmission sensor data instance(s). The steering data can be determined as a function of one or more of: the transmission sensor data instance(s), steering sensor data instance(s) generated by steering sensor(s) of the autonomous vehicle, IMU sensor data instance(s) generated by IMU sensor(s) of the autonomous vehicle, or one or more properties of the autonomous vehicle.

In some implementations, a pose instance generated based on transmission sensor data instance(s) can be utilized to verify the accuracy of additional pose instance(s) that are generated based on additional sensor data and independent of the transmission sensor data instance(s). For example, the pose instance can be compared to a temporally corresponding additional pose instance, generated based on a first sensor data instance of first sensor data generated by first sensor(s) of the autonomous vehicle, to determine an error in localization of the autonomous vehicle. In some versions of those implementations, the autonomous vehicle may perform a controlled stop if the error satisfies an error threshold.

In some additional or alternative implementations, pose instance(s) generated based on transmission sensor data instance(s) may only be generated, or may only be utilized in control of the autonomous vehicle, in response to detecting an adverse event at the autonomous vehicle. For example, if a primary control system of the autonomous vehicle fails, or if one or more primary sensors of the autonomous vehicle fail, then transmission sensor data instances can be utilized in generating the pose instances utilized in controlling the autonomous vehicle. As another example, transmission sensor data instances can, during operation of the autonomous vehicle, continuously be utilized in generating pose instances, but such transmission sensor based data instances only utilized in control of the autonomous vehicle responsive to the primary control system, or primary sensor(s), of the autonomous vehicle failing. In various implementations, the autonomous vehicle may perform a controlled stop using pose instances that are generated based on the transmission sensor data instances, and the controlled stop can be performed in response to detecting the adverse event at the autonomous vehicle.

Therefore, consistent with one aspect of the invention, a method for localization of an autonomous vehicle (AV) is described herein. The method may include receiving a transmission sensor data instance generated by a sensor of the AV, generating, based on the transmission sensor data instance, a pose instance of a pose of the AV, and causing the AV to be controlled based on the pose instance of the AV.

These and other implementations of technology disclosed herein can optionally include one or more of the following features.

In some implementations, the method may further include detecting an adverse event at the AV. Causing the AV to be controlled based on the pose instance of the AV, that are generated based on the transmission sensor data instance, may be in response to detecting the adverse event at the AV. In some versions of those implementations, detecting the adverse event comprises detecting that one or more wheel encoders of the AV have failed. In some additional or alternative versions of those implementations, causing the AV to be controlled based on the pose instance of the AV may include causing the AV to perform a controlled stop based on the pose instance of the AV.

In some implementations, the method may further include determining steering data of the AV that indicates a steering angle of the AV, and that temporally corresponds to the transmission sensor data instance. Generating the pose instance may be further based on the steering data of the AV that temporally corresponds to the transmission sensor data instance.

In some versions of those implementations, determining the steering data of the AV may include receiving, from a steering sensor of the AV, a steering sensor data instance generated by the steering sensor of the AV, determining, based on the steering sensor data instance, a road-wheel angle of a simulated center wheel of the AV, and using the road-wheel angle of the simulated center wheel of the AV as the steering data of the AV in generating the pose instance. In some further versions of those implementations, determining the road-wheel angle of the simulated center wheel of the AV may include processing, using a transmission model, the transmission sensor data instance and the steering sensor data instance, along with one or more properties of the AV, to generate output that indicates the road-wheel angle of the simulated center wheel of the AV. In yet further versions of those implementations, the one or more properties of the AV may include one or more of: a distance from a center of the AV to a center of the center simulated wheel of the AV, a length of the AV, a width of the AV, a steering ratio of the AV, or a radius of one or more wheels of the AV.

In some additional or alternative versions of those implementations, determining the steering data of the AV may include receiving, from one or more IMUs of the AV, an IMU data instance generated by one or more of the IMUs of the AV, determining, based on the IMU data instance, a road-wheel angle of a simulated center wheel of the AV, and using the road-wheel angle of the simulated center wheel of the AV as the steering data of the AV in generating the pose instance. In some further versions of those implementations, determining the road-wheel angle of the simulated center wheel of the AV may include processing, using a transmission model, the transmission sensor data instance and the IMU data instance, along with one or more properties of the AV, to generate output that indicates the road-wheel angle of the simulated center wheel of the AV.

In some additional or alternative versions of those implementations, determining the steering data of the AV may include receiving, from one or more IMUs of the AV, an IMU data instance generated by one or more of the IMUs of the AV, determining, based on the IMU data instance, a first road-wheel angle of a first front wheel of the AV. determining, based on the IMU data instance, a second road-wheel angle of a second front wheel of the AV, and using the determined first road-wheel angle of the first front wheel of the AV and the determined second road-wheel angle of the second front wheel of the AV as the steering data of the AV in generating the pose instance. In some further versions of those implementations, the method may further include processing, using a transmission model, the transmission sensor data instance and the IMU data instance, along with one or more properties of the AV, to generate output that indicates the first road-wheel angle of the first front wheel of the AV and the second road-wheel angle of the second front wheel of the AV.

In some additional or alternative versions of those implementations, determining the steering data of the AV may further include receiving, from a steering sensor of the AV, a steering sensor data instance generated by the steering sensor of the AV, and using the steering sensor data instance as the steering data of the AV in generating the pose instance.

In some implementations, the method may further include comparing the pose instance to an additional pose instance of the pose of the AV. The additional pose instance may be generated based on an IMU data instance generated by one or more IMUs of the AV and a wheel encoder data instance generated by one or more wheel encoders of the AV. Further, both the IMU data instance and the wheel encoder data instance may temporally correspond to the transmission sensor data instance. The method may further include determining, based on the comparing, an error in the additional pose instance. Causing the AV to be controlled based on the pose instance of the AV may be in response to determining the error in the additional pose instance satisfies an error threshold.

Consistent with another aspect of the invention, an autonomous vehicle (AV) control system is described herein. The AV control system may include at least one processor, and at least one memory storing instructions that are operable, when executed by the at least one processor, cause the at least one processor to perform operations including: receiving a transmission sensor data instance generated by a sensor of the AV, generating, based on the transmission sensor data instance, a pose instance of a pose of the AV, and causing the AV to be controlled based on the pose instance of the AV.

These and other implementations of technology disclosed herein can optionally include one or more of the following features.

In some implementations, the operations may further include detecting an adverse event at the AV. Causing the AV to be controlled based on the pose instance of the AV, that is generated based on the transmission sensor data instance, may be in response to detecting the adverse event at the AV. In some versions of those implementations, detecting the adverse event may include detecting that one or more wheel encoders of the AV have failed. In some additional or alternative versions of those implementations, causing the AV to be controlled based on the pose instance of the AV may include causing the AV to perform a controlled stop based on the pose instance of the AV.

In some implementations, the operations further may further include determining steering data of the AV that indicates a steering angle of the AV, and that temporally corresponds to the transmission sensor data instance. Generating the pose instance may be further based on the steering data of the AV that temporally corresponds to the transmission sensor data instance.

Consistent with yet another aspect of the invention, an autonomous vehicle (AV) is described herein. The AV may include one or more sensors, at least one processor, and at least one memory storing instructions that are operable, when executed by the at least one processor, cause the at least one processor to perform operations including: receiving, from a first sensor of the one or more sensors, a transmission sensor data instance generated by the first sensor of the AV, generating, based on the transmission sensor data instance, a pose instance of a pose of the AV, and causing the AV to be controlled based on the pose instance of the AV.

Consistent with yet another aspect of the invention, an autonomous vehicle (AV) is described herein. The AV may include one or more sensors, at least one processor, and at least one memory storing instructions that are operable, when executed by the at least one processor, cause the at least one processor to perform operations including: receiving, from a first sensor of the one or more sensors, a transmission sensor data instance generated by the first sensor of the AV, generating, based on the transmission sensor data instance, a pose instance of a pose of the AV, and causing the AV to be controlled based on the pose instance of the AV.

Consistent with yet another aspect of the invention, a method for localization of an autonomous vehicle (AV) is described herein. The method may include generating a pose instance of a pose of the AV. Generating the pose instance may be based on a first sensor data instance of first sensor data generated by one or more first sensors of the AV. The method may further include causing the AV to be controlled based on the pose instance of the AV, detecting an adverse event at the AV subsequent to causing the AV to be controlled based on the pose instance of the AV, and in response to detecting the adverse event at the AV: receiving, from a transmission sensor of the AV, a transmission sensor data instance generated by the transmission sensor of the AV, generating, based on the transmission sensor data instance, an additional pose instance of the pose of the AV, and causing the AV to be controlled based on the additional pose instance of the AV. The additional pose may be generated independent of the first sensor data generated by one or more of the first sensors.

These and other implementations of technology disclosed herein can optionally include one or more of the following features.

In some implementations, the one or more first sensors of the AV may include at least one or more IMU sensors of the AV and one or more wheel encoder sensors of the AV, and the first sensor data may include IMU data generated by the one or more IMU sensors of the AV and temporally corresponding wheel encoder data generated by the one or more wheel encoder sensors of the AV. In some versions of those implementations, detecting the adverse event may include detecting one or more of the wheel encoders of the AV have failed. Causing the AV to be controlled based on the additional pose instance of the AV may include causing the AV to perform a controlled stop based on the additional pose instance of the AV.

In some implementations, the one or more first sensors may not include the transmission sensor, and the first sensor data may not include the transmission sensor data.

In some implementations, generating the pose instance of the pose of the AV may be by one or more first processors of a primary vehicle control system of the AV, and generating the additional pose instance of the pose of the AV may be by one or more second processors of a secondary vehicle control system of the AV.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
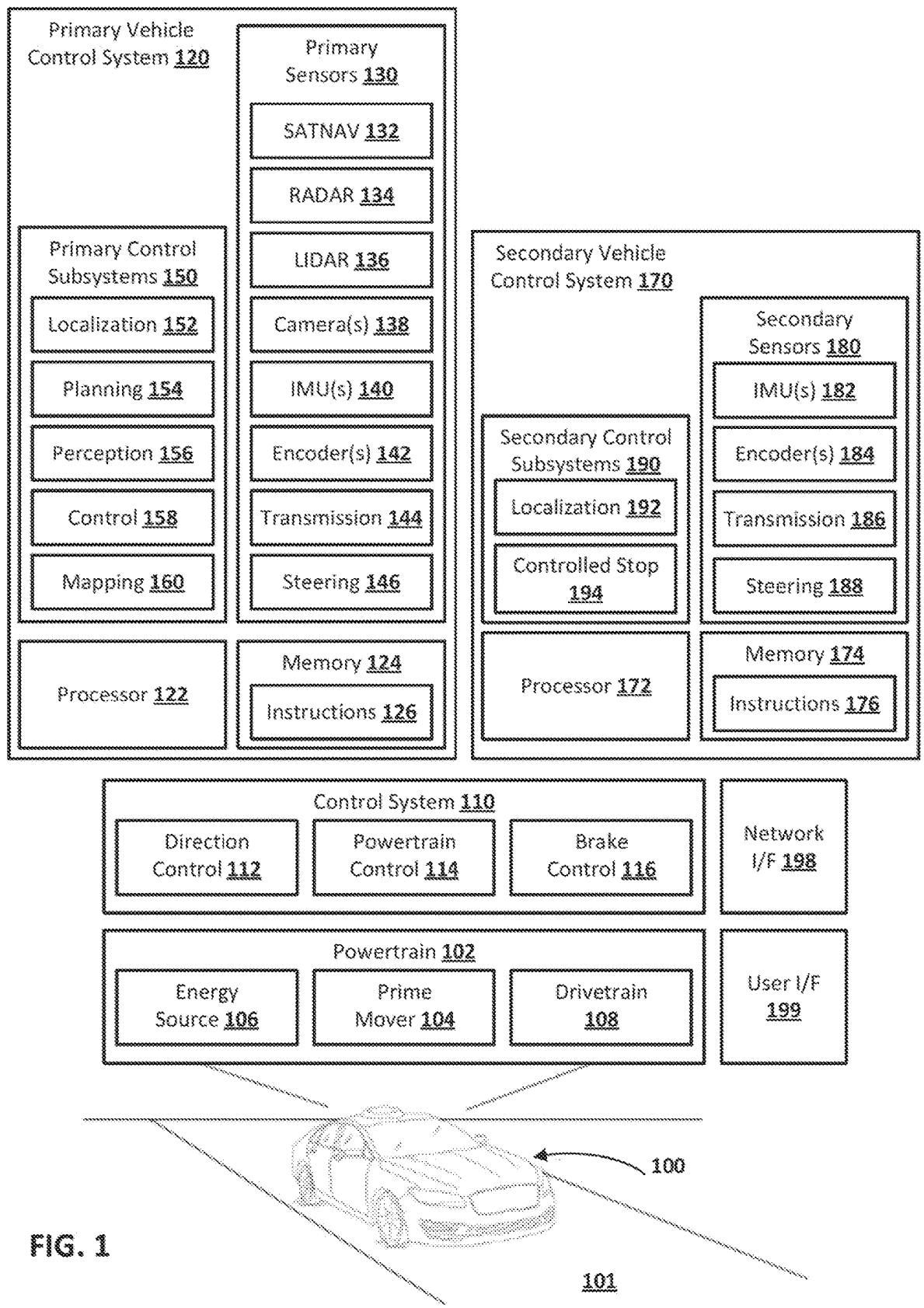
FIG. 1 illustrates an example hardware and software environment for an autonomous vehicle, in accordance with various implementations.

In various implementations, localization of an autonomous vehicle includes generating pose instances of a pose of an autonomous vehicle based on instances of transmission sensor data generated by transmission sensor(s) of the autonomous vehicle. The pose instances can include position information and orientation information of the autonomous vehicle within its surrounding environment, and are generally defined with respect to a particular frame of reference (e.g., a tile). Further, the pose instances can be transmitted to various subsystems or modules of the autonomous vehicle (or both), and can be utilized in controlling the autonomous vehicle. Moreover, the transmission sensor(s) can be connected to a transmission of the autonomous vehicle and operably coupled to a front differential of the autonomous vehicle. Instance(s) of the transmission sensor data can be utilized to determine a transmission-based speed of the autonomous vehicle that is utilized in generating a pose instance.

In some implementations, generating the pose instance(s) can be further based on steering data that indicates steering angle(s) of the autonomous vehicle, and that temporally correspond to the instance(s) of the transmission sensor data. The steering data can be determined as a function of one or more of: the transmission sensor data instance(s), steering sensor data instance(s) generated by steering sensor(s) of the autonomous vehicle, IMU sensor data instance(s) generated by IMU sensor(s) of the autonomous vehicle, or one or more properties of the autonomous vehicle. For example, a road-wheel angle of one or more wheels of the autonomous vehicle (or a simulated wheel of the autonomous vehicle) or an angular velocity of the autonomous vehicle (or both) can be determined based on the steering sensor data instance(s) generated by steering sensor(s) of the autonomous vehicle. As another example, an angular velocity of the autonomous vehicle may be determined based on a temporally corresponding instance of IMU data generated by one or more IMU(s) of the autonomous vehicle. The road-wheel angle of one or more of the wheels of the autonomous vehicle or the angular velocity of the autonomous vehicle (or both) can optionally be utilized in generating the pose instance.

In some versions of those implementations, the instance of the transmission sensor data (and optionally along with the instance of the steering sensor data) can be processed by one or more of multiple disparate transmission model(s) prior to generating the pose instance. The transmission model(s) can include various representations of the autonomous vehicle or various functions associated therewith, that can be used to process the instance of transmission sensor data, properties of the autonomous vehicle, instances of other sensor data generated by one or more sensors of the autonomous vehicle, and any combination thereof. The transmission model(s) can be utilized to determine the transmission-based speed of the autonomous vehicle, the road-wheel angle of one or more of the wheels of the autonomous vehicle, the angular velocity of the autonomous vehicle, or any combination thereof. In other versions of those implementations, the transmission model(s) may be omitted, and the pose instance may be generated based on the instance of the transmission sensor data, the instance of the steering sensor data without utilization of the transmission model(s), or both.

In various implementations, the pose instance generated based on the instance of the transmission sensor data can be compared to a temporally corresponding additional pose instance of the pose of the autonomous vehicle. The additional pose instance can be generated based on an instance of first sensor data generated by one or more first sensors of the autonomous vehicle. The one or more first sensors can include, for example, IMU(s) and wheel encoder(s), and the instance of the first sensor data can include instances thereof that temporally correspond to the instance of the transmission sensor data. Since the pose instance and the additional pose instance temporally correspond, and assuming the pose instances are accurately generated, there should be little to no variance between the pose instance and the additional pose instance. In some versions of those implementations, an error in localization of the autonomous vehicle can be determined based on comparing the pose instance and the additional pose instance. In some further versions of those implementations, the autonomous vehicle may perform a controlled stop in response to determining the error in the localization satisfies an error threshold. However, if the error does not satisfy the error threshold, the error can be utilized to determine an offset to be utilized in generating further pose instances of the pose of the autonomous vehicle. Moreover, in some versions of those implementations, the error may be determined subsequent to generating each of the pose instances, whereas in other implementations the error may only be determined periodically, or at other regular or non-regular intervals.

In some additional or alternative implementations, the instance of the transmission sensor data may only be generated or may only be utilized in control of the autonomous vehicle in response to detecting an adverse event at the autonomous vehicle. For example, assume initial pose instances are generated utilizing instances of the first sensor data as described above, and assume that wheel encoders fail. In this example, the transmission sensors can be utilized as a proxy for the failed wheel encoders of the autonomous vehicle, and the autonomous vehicle can operate using the pose instances generated using the transmission sensor data even though wheel encoder data in no longer available. In some versions of those implementations, the autonomous vehicle may perform a controlled stop utilizing subsequent pose instances generated based on further instances of the transmission sensor data.

As used herein, the term "tile" refers to a previously mapped portion of a geographical area. A plurality of tiles can be stored in memory of various systems described herein, and the plurality of tiles can be used to represent a geographical region. For example, a given geographical region, such as a city, can be divided into a plurality of tiles (e.g., a square mile of the city, a square kilometer of the city, or other dimensions), and each of the tiles can represent a portion of the geographical region. Further, the tiles can be stored in database(s) that are accessible by various systems described herein, and the tiles can be indexed in the database(s) by their respective locations within the geographical region. Moreover, the tiles can include, for example, information contained within the tiles, such as intersection information, traffic light information, landmark information, street information, other information for the geographical area represented by the tiles, or any combination thereof. The information contained within the tiles can be utilized to identify a matching tile.

As used herein, the term "pose" refers to location information and orientation information of an autonomous vehicle within its surroundings, and generally with respect to a particular frame of reference. The pose can be an n-dimensional representation of the autonomous vehicle within the frame of reference, such any 2D, 3D, 4D, 5D, 6D, or any other dimensional representation. The frame of reference can be, for example, the aforementioned tile(s), longitude and latitude coordinates, a relative coordinate system, or other frame(s) of reference. Moreover, various types of poses are described herein, and different types of poses can be defined with respect different frame(s) of reference.

Prior to further discussion of these and other implementations, however, an example hardware and software environment that the various techniques disclosed herein may be implemented will be discussed.

Turning to the drawings, wherein like numbers denote like parts throughout the several views, FIG. 1 illustrates an example autonomous vehicle 100 that the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114, and a brake control 116. Vehicle 100 may be implemented as any number of different types of vehicles, including vehicles capable of transporting people or cargo, and capable of traveling by land, by sea, by air, underground, undersea, or in space, and it will be appreciated that the aforementioned components 102-116 can vary widely based upon the type of vehicle that these components are utilized.

The implementations discussed hereinafter, for example, will focus on a wheeled land vehicle such as a car, van, truck, bus, etc. In such implementations, the prime mover 104 may include one or more electric motors or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and (and optionally tires) along with a transmission, differential, or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In various implementations, different combinations of powertrains 102 and energy sources 106 may be used. In the case of electric/gas hybrid vehicle implementations, one or more electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

Direction control 112 may include one or more actuators, sensors (e.g., a steering sensor 146, 188 of vehicle 100), or some combination thereof for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations, various components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (including various degrees of autonomy as well as selectively autonomous functionality) may be implemented in a primary vehicle control system 120 that includes processor(s) 122 and memory 124, with each processor(s) 122 configured to execute program code instruction(s) 126 stored in memory 124. The memory 124 can also store one or more properties of vehicle 100. The properties of vehicle 100 can include, for example, a steering ratio for vehicle 100, a width of a wheelbase for vehicle 100, a length of vehicle 100, other properties of vehicle 100, or any combination thereof.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. A Radio Detection and Ranging (RADAR) sensor 134 and a Light Detection and Ranging (LIDAR) sensor 136, as well as digital camera(s) 138 (including various types of image capture devices capable of capturing still and video imagery), may be used to sense stationary and moving objects within the immediate vicinity of a vehicle. Inertial measurement unit(s) (IMU(s)) 140 may include multiple gyroscopes and accelerometers capable of detection linear and rotational motion of vehicle 100 in three directions, while wheel encoder(s) 142 may be used to monitor the rotation of one or more wheels of vehicle 100. Further, transmission sensor 144 may determine a current transmission speed, a current gear ratio of vehicle 100 or a transmission speed of a transmission shaft of vehicle 100. As discussed in greater detail herein (e.g., with respect to FIGS. 2A, 2B, and 3A-3C), a transmission speed of vehicle 100 can be determined using transmission sensor data instances of transmission sensor data generated by the transmission sensor 144. Moreover, steering sensor 146 may determine an estimated steering angle of vehicle 100 based on the feedback from the direction or steering components noted above with respect to direction control 112. As discussed in greater detail herein (e.g., with respect to FIGS. 2A, 2B, and 3A-3C), a steering angle of one or more wheels of vehicle 100 can be determined using steering sensor data instances of steering sensor data generated by the steering sensor 146.

The outputs of sensors 132-146 may be provided to a set of primary control subsystems 150, including, a localization subsystem 152, a planning subsystem 154, a perception subsystem 156, a control subsystem 158, and a mapping subsystem 160. Localization subsystem 152 determines a "pose" of vehicle 100. In some implementations, the pose can include the location information and orientation information of vehicle 100. In some other implementations, the pose can additionally include velocity information or acceleration information of vehicle 100.

In some implementations, localization subsystem 152 may generate a "global pose" of vehicle 100 within its surrounding environment, and within a particular frame of reference. In some additional or alternative implementations, localization subsystem 152 may generate a "local pose" of vehicle 100 within its surrounding environment, and within some frame of reference. As discussed in greater detail herein (e.g., with respect to FIGS. 2A and 2B), localization subsystem 152 can pose instances of vehicle 100 by processing sensor data output by one or more of sensors 132-146.

Planning subsystem 154 may plan a path of motion for vehicle 100 over a particular timeframe given a desired destination as well as the static and moving objects within the environment, while perception subsystem 156 may detect, track and identify elements within the environment surrounding vehicle 100. Control subsystem 158 may generate suitable control signals for controlling the various controls in control system 110 in order to implement the planned path of the vehicle. Mapping subsystem 160 may be provided in the illustrated implementations to describe the elements within an environment and the relationships therebetween, and may be accessed by the localization, planning and perception subsystems 152-156 to obtain various information about the environment for use in performing their respective functions.

Vehicle 100 also includes a secondary vehicle control system 170 that includes one or more processors 172 and memory 174 capable of storing program code instruction(s) 176 for execution by processor(s) 172. The memory 174 can also store one or more properties of vehicle 100. The properties of vehicle 100 can include, for example, a steering ratio for vehicle 100, a width of a wheelbase for vehicle 100, a length of vehicle 100, other properties of vehicle 100, or any combination thereof. In some implementations, secondary vehicle control system 170, may be used in conjunction with primary vehicle control system 120 in normal operation of vehicle 100. In some additional or alternative implementations, secondary vehicle control system 170, may be used as a redundant or backup control system for vehicle 100, and may be used, among other purposes, to continue planning and navigation, to perform controlled stops in response to adverse events detected in primary vehicle control system 120, etc. Adverse events can include, for example, one or more of: a detected hardware failure in vehicle control systems 120, 170, a detected software failure in vehicle control systems 120, 170, a detected failure of sensor systems 130, 180, or other adverse events.

Secondary vehicle control system 170 may also include a secondary sensor system 180 including various sensors used by secondary vehicle control system 170 to sense the conditions and surroundings of vehicle 100. For example, IMU(s) 182 may be used to generate linear and rotational motion information about the vehicle, while wheel encoder(s) 184 may be used to sense the velocity of the wheels. Further, transmission sensor 186 may determine a current transmission speed, a current gear ratio of vehicle 100 or a transmission speed of a transmission shaft of vehicle 100. As discussed in greater detail herein (e.g., with respect to FIGS. 2A, 2B, and 3A-3C), a transmission speed of vehicle 100 can be determined using transmission sensor data instances of transmission sensor data generated by transmission sensor 186. Moreover, steering sensor 188 may determine an estimated steering angle of vehicle 100 based on the feedback from the direction or steering components noted above with respect to direction control 112. As discussed in greater detail herein (e.g., with respect to FIGS. 2A, 2B, and 3A-3C), a steering angle of one or more wheels of vehicle 100 can be determined using steering sensor data instances of steering sensor data generated by the steering sensor 188. One or more of IMU(s) 182, wheel encoder(s) 184, transmission sensor 186, or steering sensor 188 of secondary sensor system 180 may be the same as or distinct from one or more of IMU(s) 140, wheel encoder(s) 142, transmission sensor 144, or steering sensor 146 of the primary sensor system 130.

Further, secondary vehicle control system 170 may also include secondary control subsystems 190, including at least localization subsystem 192 and controlled stop subsystem 194. Localization subsystem 192 may also determine the pose of vehicle 100 relative to a previous local pose of vehicle 100. In some implementations, localization subsystem 192 may generate a local pose of vehicle 100 within its surrounding environment, and within a particular frame of reference. In some additional or alternative implementations, localization subsystem 192 may also generate a global pose of vehicle 100 within its surrounding environment, and within a particular frame of reference. As discussed in greater detail herein (e.g., with respect to FIGS. 2A and 2B), localization subsystem 192 can pose instances of vehicle 100 by processing sensor data output by one or more of sensors 182-188. Controlled stop subsystem 194 is used to implement a controlled stop for vehicle 100 upon detection of an adverse event. Other sensors or subsystems that may be utilized in secondary vehicle control system 170, as well as other variations capable of being implemented in other implementations, will be discussed in greater detail below.

In general, it should be understood an innumerable number of different architectures, including various combinations of software, hardware, circuit logic, sensors, networks, etc. may be used to implement the various components illustrated in FIG. 1. Each processor(s) 122, 172 may be implemented, for example, as a microprocessor and each memory 124, 174 may represent the random access memory (RAM) devices comprising a main storage, as well as any supplemental levels of memory, e.g., cache memories, non-volatile or backup memories (e.g., programmable or flash memories), read-only memories, etc. In addition, each memory 124, 174 may be considered to include memory storage physically located elsewhere in vehicle 100 (e.g., any cache memory in processor(s) 122, 172), as well as any storage capacity used as a virtual memory (e.g., as stored on a mass storage device or on another computer or controller). Processor(s) 124, 174 illustrated in FIG. 1, or entirely separate processors, may be used to implement additional functionality in vehicle 100 outside of the purposes of autonomous control (e.g., to control entertainment systems, to operate doors, lights, convenience features, and so on).

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, or a tape drive, among others. Furthermore, vehicle 100 may include a user interface 199 to enable vehicle 100 to receive a number of inputs from and generate outputs for a user or operator (e.g., using one or more displays, touchscreens, voice interfaces, gesture interfaces, buttons and other tactile controls, or other input/output devices). Otherwise, user input may be received via another computer or electronic device (e.g., via an app on a mobile device) or via a web interface (e.g., from a remote operator).

Moreover, vehicle 100 may include one or more network interfaces 198 suitable for communicating with one or more networks (e.g., a LAN, a WAN, a wired network, a wireless network, or the Internet, among others) to permit the communication of information between various components of vehicle 100 (e.g., between powertrain 102, control system 110, primary vehicle control system 120, secondary vehicle control system 170, or other systems or components), with other vehicles, computers or electronic devices, including, for example, a central service, such as a cloud service, that vehicle 100 receives environmental and other data for use in autonomous control thereof. For example, vehicle 100 may be in communication with a cloud-based remote vehicle service including a relative atlas service and a log collection service. Relative atlas service may be used via RAS 160, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log collection service may be used, for example, to collect and analyze observations made via sensors 130, 180 of one or more autonomous vehicles during operation, enabling updates to be made to the global repository, as well as for other purposes.

Each processor(s) 122, 172 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application that it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners that computer programs may be organized into routines, procedures, methods, modules, objects, and the like, as well as the various manners that program functionality may be allocated among various software layers that are resident within a typical computer (e.g., operating systems, libraries, API's, applications, applets, etc.), it should be appreciated that the invention is not limited to the specific organization and allocation of program functionality described herein.

It will be appreciated that the collection of components illustrated in FIG. 1 for primary vehicle control system 120 and secondary vehicle control system 170 are merely for the sake of example. Individual sensors may be omitted in some implementations, multiple sensors of the types illustrated in FIG. 1 may be used for redundancy or to cover different regions around a vehicle, and other types of sensors may be used. Likewise, different types or combinations of control subsystems may be used in other implementations. Further, while subsystems 152-160, 192-194 are illustrated as being separate from processors 122, 172 and memory 124, 174, respectively, it will be appreciated that in some implementations, a portion of, or all of, the functionality of subsystems 152-160, 192-194 may be implemented with corresponding program code instruction(s) 126, 176 resident in one or more memories 124, 174 and executed by processor(s) 122, 174 and that these subsystems 152-160, 192-194 may in some instances be implemented using the same processors and memory. Subsystems 152-160, 192-194 in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and other components. Further, the various components in primary vehicle control system 120 and secondary vehicle control system 170 may be networked in various manners.

Those skilled in the art will recognize that the exemplary environment illustrated in FIG. 1 is not intended to limit the present invention. Indeed, those skilled in the art will recognize that other alternative hardware and software environments may be used without departing from the scope of the invention.

Figure 2A:
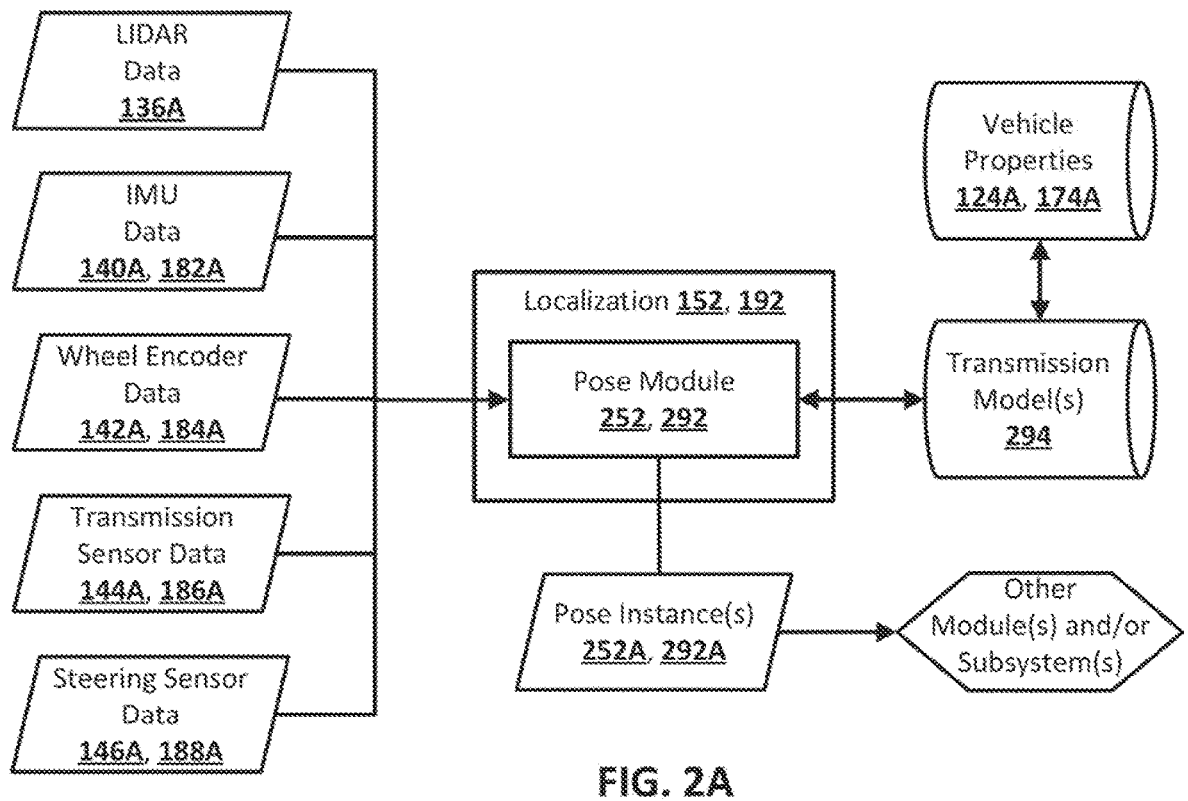
FIG. 2A is a block diagram illustrating an example implementation of using transmission model(s) along with the localization subsystem(s) referenced in FIG. 1 during normal operation of an autonomous vehicle, in accordance with various implementations.
Figure 2B:
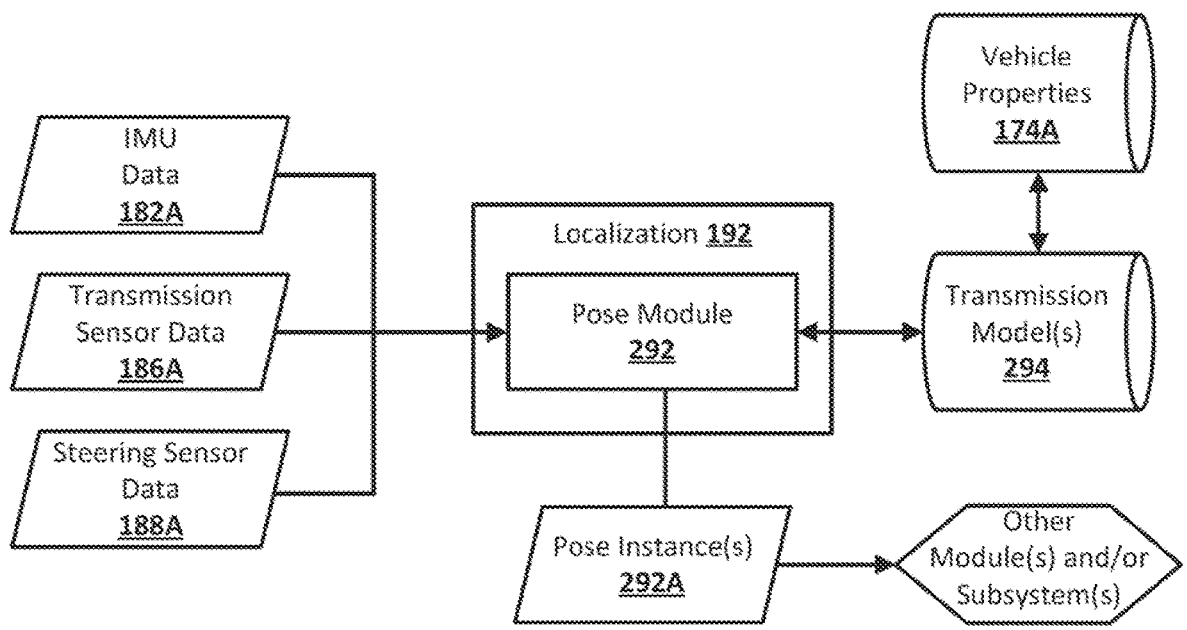
FIG. 2B is a block diagram illustrating an example implementation of using transmission model(s) along with the localization subsystem(s) referenced in FIG. 1 in response to detecting an adverse event at an autonomous vehicle, in accordance with various implementations.

Turning now to FIG. 2A, a block diagram illustrating an example implementation of using transmission model(s) 294 in localization subsystem(s) 152, 192 referenced in FIG. 1 during normal operation of vehicle 100 is depicted. Localization subsystem 152 of primary vehicle control system 120 can include at least pose module 252 for generating pose instance(s) 252A of a pose of vehicle 100, and localization subsystem 192 of secondary vehicle control system 170 can include at least pose module 292 for generating the pose instance(s) 292A of the pose of vehicle 100. The pose instance(s) 252A, 292A can include orientation and location information of vehicle 100 with respect to a reference frame (e.g., tile(s)) at a given instance of time. Notably, localization subsystem(s) 152, 192 and their corresponding pose module(s) 252, 292 are depicted at the same block in the diagrams of FIG. 2A. It should be understood that this is for the sake of simplicity and is not meant to be limiting. Further, it should also be understood that the corresponding pose module(s) 252, 292 can generate global pose instances of a global pose of vehicle 100, local pose instances of a local pose of vehicle 100, or both of global poses instances and local pose instances based on various instances of sensor data generated by sensors of vehicle 100.

In some implementations, pose module 252 can generate a pose instance 252A of a pose of vehicle 100 based on instances of LIDAR data 136A generated by the LIDAR sensor 136 of primary sensor system 130. The pose instance 252A generated based on the instances of the LIDAR data 136A can be considered a global pose instance of a global pose of vehicle 100 or a LIDAR-based pose instance of vehicle 100. In some implementations, the LIDAR sensor 136 can have a sensing cycle. For example, the LIDAR sensor 136 can scan a certain area during a particular sensing cycle to detect an object or an environment in the area. In some versions of those implementations, a given instance of the LIDAR data 136A can include the LIDAR data 136A from a given sensing cycle of LIDAR sensor 136. In other words, a given LIDAR data instance correspond to, for example, a given sweep of the LIDAR sensor 136 generated during the sensing cycle of the LIDAR sensor 136. The LIDAR data 136A generated during the sensing cycle of LIDAR sensor 136 can include, for example, a plurality of points reflected off of a surface of an object in an environment of vehicle 100, and detected by at least one receiver component of the LIDAR component as data points.

During a given sensing cycle, the LIDAR sensor 136 detects signals reflected from the environment of vehicle 100 and generates a plurality of data points based on the reflected signals. In some versions of those implementations, the pose instance 252A generated based on the LIDAR data 136A can also be generated based on other pose instances. The other pose instances can provide information as to a current tile that vehicle 100 is located. For example, the pose instance 252A generated based on the LIDAR data 136A can be generated based on a temporally corresponding local pose instance that indicates a given tile vehicle 100 is located. In some versions of those implementations, the LIDAR data 136A can correspond to one or more point clouds, and aligned with a previously stored point cloud using various geometric matching techniques (e.g., iterative closest point or other geometric matching techniques) to determine the pose instance 252A of the pose of vehicle 100. The previously stored point cloud can be stored in association with the tile included in information provided by the temporally corresponding local pose instance. Although the LIDAR-based pose instance is described herein as being generated by pose module 252, it should be understood that is for the sake of example and that the LIDAR-based pose instance can additionally or alternatively be generated by pose module 292 as pose instance 292A.

In some additional or alternative implementations, pose module 252 can generate a pose instance 252A of a pose of vehicle 100 based on instances of first sensor data generated by first sensor(s) of vehicle 100. In some versions of those implementations, the first sensor(s) can include at least the IMU(s) 140, 182, the wheel encoder(s) 142, 184, and the instances of the first sensor data can include at least IMU data 140A, 182A generated by the IMU(s) 140, 182 and wheel encoder data 142A, 184A generated by the wheel encoder(s) 142, 184. The pose instance 252A generated based on the instances of the first sensor data can be considered a local pose instance of a local pose of vehicle 100 or a non-LIDAR based pose instance of vehicle 100. The instances of the first sensor data can include instances of the IMU data 140A, 182A, the wheel encoder data 142A, 184A, or some combination thereof. In particular, the instances of the IMU data 140A, 182A can be the most recently generated instances of the IMU data 140A, 182A. The IMU(s) 140, 182 can include accelerometers or gyroscopes, and the IMU data 140A, 182A can include various measurements by the accelerometers or gyroscopes. The wheel encoder(s) 142, 184 can include various sensors (e.g., Hall Effect sensors) or other components (e.g., magnets), and the wheel encoder(s) 142, 184 can be operably coupled to one or more wheels of vehicle 100. Further, the wheel encoder data 142A, 184A can include a number of accumulated ticks of the wheel encoder(s) 142, 184 as the one or more wheels of the vehicle 100 rotate. In some versions of those implementations, the pose instance(s) 252A, 292A that are generated directly based on instances the IMU data 140A, 182A, the wheel encoder data 142A, 184A, or both, can be considered local pose instances of a local pose of vehicle 100. The pose instance 252A can be transmitted to one or more other module(s) or subsystem(s) for use in controlling vehicle 100. Although the non-LIDAR-based pose instance is described herein as being generated by pose module 252, it should be understood that is for the sake of example and that the non-LIDAR-based pose instance can additionally or alternatively be generated by pose module 292 as pose instance 292A.

In various implementations, pose module 252 can generate pose instance 252A based on an instance of transmission sensor data 144A, 186A generated by transmission sensor(s) 144, 186 of vehicle 100, and an instance of the first sensor data described above. The transmission sensor data instance can include, for example, a rotational velocity of one or more transmission shafts of the autonomous vehicle, a gear ratio or current gear of the transmission of the autonomous vehicle, other transmission related data, or any combination thereof. The pose instance 252A generated utilizing the instance of the transmission sensor data can be considered a transmission-based pose instance of vehicle 100. Each of the instances of the transmission sensor data 144A, 186A can include a most recently generated instance thereof.

In some versions of those implementations, the pose instance 252A may optionally be further generated based on steering data of the autonomous vehicle. The steering data can include, for example, one or more of: a road-wheel angle of one or more real or simulated wheels of vehicle 100, an angular velocity of vehicle 100, or a heading rate of vehicle 100 (including a speed and directional component of vehicle 100). The steering data can be determined based on, for example, an instance of steering sensor data 146A, 188A generated by steering sensor(s) 146, 188 of vehicle 100, an instance of IMU data 140A, 182A generated by IMU sensor(s) 140, 182 of vehicle 100, one or more properties of vehicle. The steering sensor data instance can include, for example, one or more of: an estimated steering angle of the autonomous vehicle, an angle of a steering wheel of the autonomous vehicle, or other steering relates measures. Further, the one or more vehicle properties can include, for example, one or more of: a steering ratio of a steering wheel of vehicle 100, a radius of each of the wheels of vehicle 100, a wheelbase of vehicle 100, a length of vehicle 100, or other properties of vehicle 100.

In some versions of those implementations, pose module 252 can utilize transmission model(s) stored in transmission model(s) database 294 to process the instance of the transmission sensor data 144A, 186A, the instance of the steering sensor data 146A, 188A, the instance of the IMU data 140A, 182A, one or more of the properties of vehicle 100 prior to generating the pose instance 252A to determine the steering data, or any combination thereof. Utilizing the transmission model(s) stored in the transmission model(s) database 294 is described in greater detail herein (e.g., with respect to FIGS. 3A-3C). In other versions of those implementations, pose module 252 can utilize the instance of the transmission sensor data 144A, 186A, the instance of the steering sensor data 146A, 188A in generating the pose instance 252A without utilizing the transmission model(s), or both. Although the transmission-based pose instance is described herein as being generated by pose module 252, it should be understood that is for the sake of example and that the transmission-based pose instance can additionally or alternatively be generated by pose module 292 as pose instance 292A.

Notably, the LIDAR-based pose instance, the non-LIDAR based pose instance, the transmission-based pose instance, or any combination thereof can temporally correspond to one another. Further, the pose instances can be generated in parallel by one or more of pose module(s) 252, 292. Put another way, the pose instances can be generated based one sensor data that is generated at the same time or within a threshold amount of time (e.g., within 50 milliseconds, 100 milliseconds, 200 milliseconds, or other thresholds amount of time). In some implementations, one or more of the pose instances can be compared to determine an error in the localization of vehicle 100. The error can be determined for subsequent to generating each of the pose instances 252A, 292A generated by pose modules 252, 292. Additionally or alternatively, the error can be determined periodically for the pose instances 252A, 292A generated by pose modules 252, 292 (e.g., every N instances of the pose, every N seconds or milliseconds, and so on, where N is a positive integer). In some versions of those implementations, if the error satisfies an error threshold, then vehicle 100 may perform one or more particular operations. The particular operations that the vehicle 100 can perform in response to the error satisfying the error threshold can include, for example, one or more of performing a controlled stop of the vehicle 100, requesting a teleoperation system take over control of the vehicle 100, or requesting a human operator take over control of the vehicle. Otherwise, vehicle 100 can continue normal operation using the generated pose instances.

For example, assume pose module 252 generates a non-LIDAR-based pose instance as the pose instance 252A, and further assume pose module 292 generates a temporally corresponding transmission-based pose instance as the pose instance 292A. In this example, assuming pose module(s) 252, 292 accurately generate the pose instance(s) 252A, 292A, there should be no difference between the non-LIDAR-based pose instance and the transmission-based pose instance. Accordingly, the non-LIDAR-based pose instance and the transmission-based pose instance can be compared to determine an error in the localization of vehicle 100. Again, this error determination can be performed for at least one of the non-LIDAR-based pose instances generated by pose module(s) 252, 292, or periodically. Thus, the transmission-based pose instance can be utilized to verify the accuracy of the non-LIDAR-based pose instance. As another example, the transmission-based pose instance can be similarly utilized to determine an error in the LIDAR-based pose instance.

In various implementations, one or more adverse events may detected at vehicle 100. Adverse events can include, for example, a detected hardware failure in vehicle control systems (e.g., control systems 120, 170), a detected software failure in vehicle control systems 120, 170, a detected failure of sensor systems 130, 180 or sensors thereof, other adverse events, or any combination thereof. For example, turning now to FIG. 2B, assume that the primary vehicle control system 120 and that wheel encoder sensor(s) 142, 184 of vehicle 100 have failed. In this example, localization subsystem 192 of the secondary control system 170 can still be utilized to control vehicle 100 even though the primary vehicle control system 120 has failed. Although the LIDAR data 136A and the wheel encoder data 142A, 184A is unavailable, instances of the IMU data 182A, the transmission sensor data 186A, the steering data, or any combination thereof can still be utilized in generating the pose instance 292A for controlling vehicle 100. Moreover, pose module 292 can access the transmission model(s) 294 to process the transmission sensor data 144A, 186A or the steering data prior to generating the pose instance 292A as described in more detail below with respect to FIGS. 3A-3C. The pose instance 292A can be transmitted to other module(s) or subsystem(s) for use in controlling vehicle 100.

In some versions of those implementations, vehicle 100 can continue normal operation based on the pose instance(s) 292 even though the adverse event has been detected. In contrast, in some other versions of those implementations, vehicle 100 can perform a controlled stop based on the pose instance(s) 292 in response to detecting the adverse event. Whether vehicle continues to operate or performs a stop may dependent on the adverse event that is detected. For example, if the primary vehicle control system 120 and the sensors 130 associated therewith fail as described with respect to FIG. 2B, then vehicle 100 may perform a controlled stop due to losing communication with various subsystems. However, if only the wheel encoder sensor(s) 142, 184 fail, then vehicle 100 can continue operating using the available sensor(s) or subsystem(s).

Figure 3A:
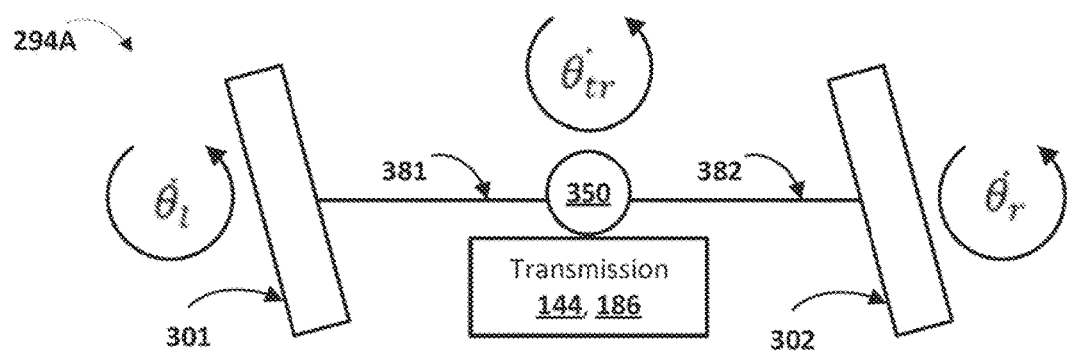
FIGS. 3A, 3B, and 3C illustrate example implementations of the transmission model(s) referenced in FIGS. 2A and 2B, in accordance with various implementations.
Figure 3B:
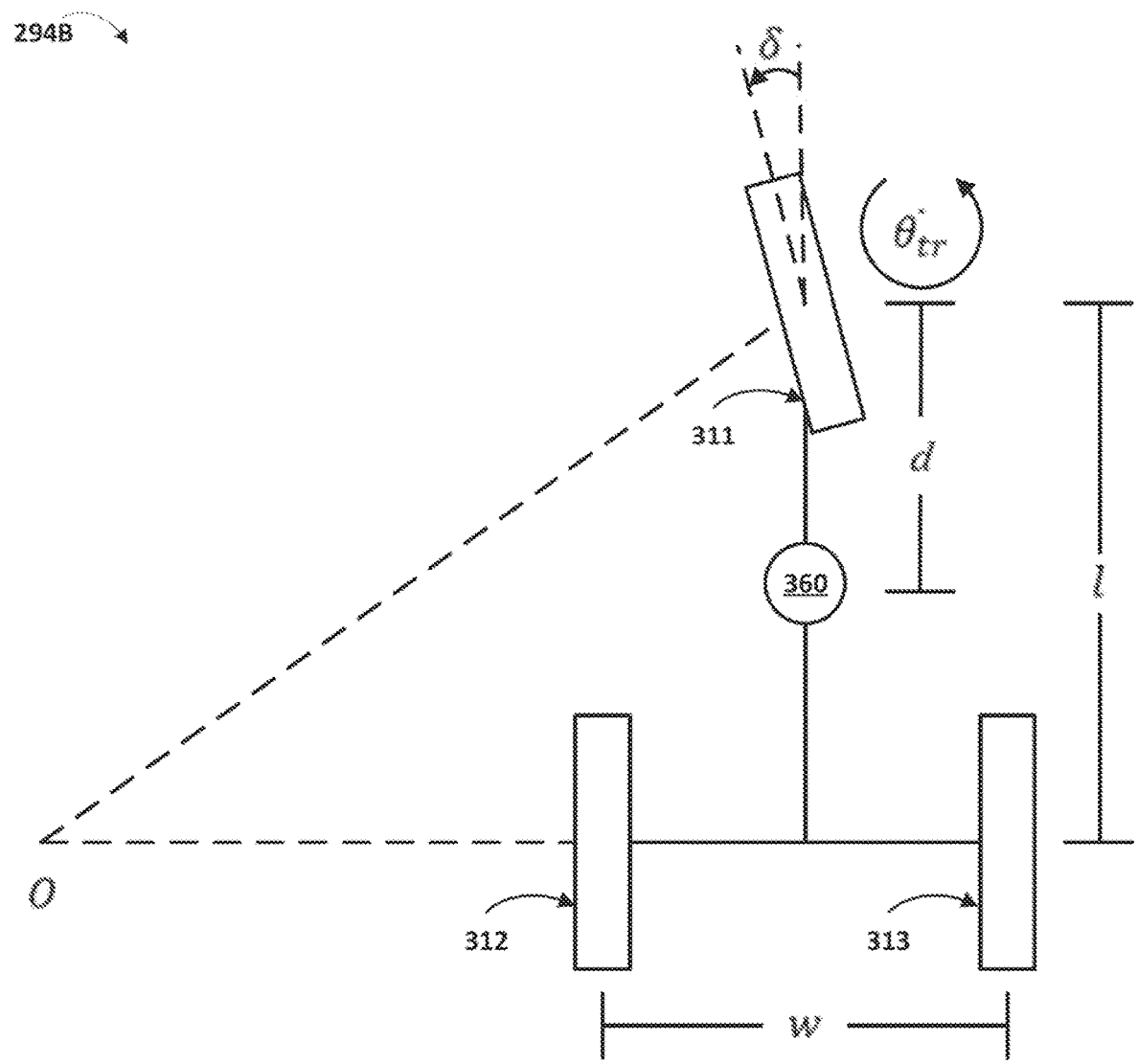
Figure 3C:
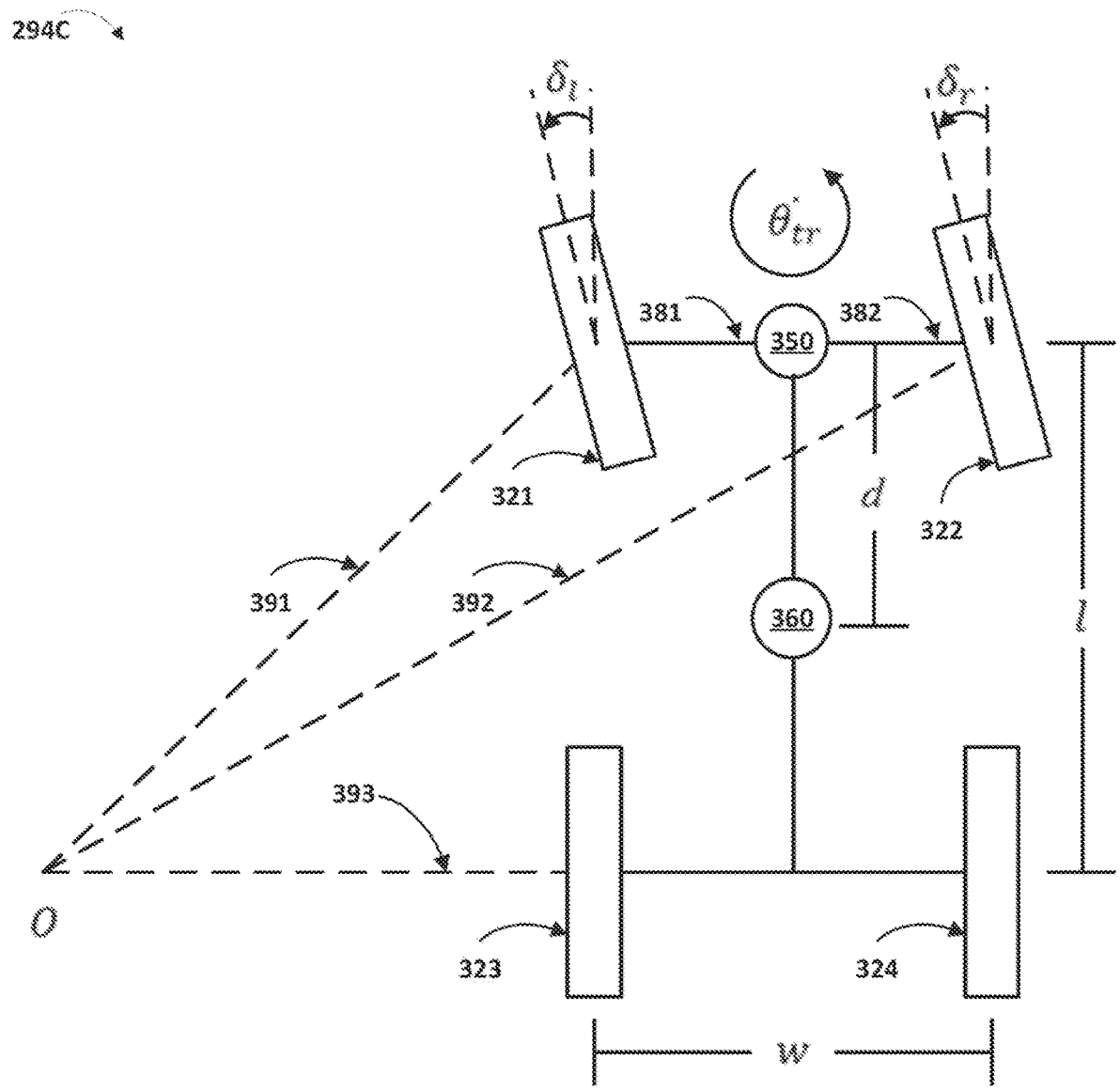

Turning now to FIGS. 3A-3C, example transmission model(s) 294A, 294B, and 294C used by the localization subsystem(s) 152, 192 referenced in FIG. 1 are illustrated. For the sake of simplicity, the transmission model(s) 294A, 294B, and 294C are described herein as being implemented by vehicle 100 of FIG. 1. It should be understood that is for the sake of example, and is not meant to be limiting. For example, the transmission model(s) 294A, 294B, and 294C can be implemented by one or more remote computing systems in communication with vehicle 100. Moreover, vehicle 100 includes a drivetrain 108 having, among other mechanical drive components, a transmission and a differential as described above with respect to FIG. 1. The transmission sensor(s) 144, 186 can be connected to the transmission, and operably coupled to a front differential 350 of vehicle 100 as shown in FIG. 3A. The front differential 350 can include one of multiple disparate gear assemblies that include various combinations of gears, shafts, pinions, carriers, or other components. For example, the front differential 350 can be an epicyclic differential, a spur-gear differential, or any other type of differential suitable for vehicle 100.

In some implementations, generating pose instance(s) of a pose of vehicle 100 can be based on an instance transmission sensor data generated by the transmission sensor(s) 144, 186 of vehicle 100 without utilization of the transmission model(s) 294A, 294B, and 294C. Put another way, the pose instance(s) generated by localization subsystems 152, 192 of vehicle 100 can be generated directly on the instance of the transmission sensor data without any processing of the transmission sensor data by the transmission model(s) 294A, 294B, and 294C. The instance of the transmission sensor data generated by the transmission sensor(s) 144, 186 of vehicle 100 can include, for example, a rotational velocity of one or more transmission shafts of vehicle 100, a gear ratio or current gear of the transmission of vehicle 100, other transmission related data, or any combination thereof. The rotational velocity of one or more of the transmission shafts included in the instance of the transmission sensor data can be utilized as a transmission-based speed of vehicle 100. Further, the pose instance(s) of vehicle 100 can also be generated based on instances of sensor data generated by other sensors of vehicle 100. For example, and as described with respect to FIG. 2A, the pose instance(s) of vehicle 100 can also be generated based on instances of temporally corresponding IMU data generated by one or more IMUs 140, 182 of vehicle 100 and wheel encoder data generated by one or more wheel encoder(s) 142, 184 of vehicle 100. However, in other examples, and as described with respect to FIG. 2B, the pose instance(s) of vehicle 100 may only be generated based on instances of temporally corresponding IMU data generated by one or more IMUs 140, 182 of vehicle 100 without utilizing the wheel encoder data.

In some additional or alternative implementations, generating the pose instance(s) of vehicle 100 can be based processing an instance transmission sensor data generated by transmission sensor(s) 144, 186 of vehicle 100 utilizing one or more of the transmission model(s) 294A, 294B, and 294C. Put another way, the pose instance(s) generated by localization subsystems 152, 192 of vehicle 100 can be generated indirectly based on the instance of the transmission sensor data. For example, referring specifically to FIG. 3A, a differential model 294A is depicted. The differential model 294A can include a first front wheel 301 (e.g., a left front wheel) mechanically linked to a second front wheel 302 (e.g., a right front wheel) by a front axle. The front axle can be comprised of a first front axle shaft 381 connected to the first front wheel 301 and second front axle shaft 382 connected to the second front wheel 302 with the front differential 350 being interposed therebetween.

In some versions of those implementations, a transmission-based speed $\dot{\theta}_{tr}$ of vehicle 100 can be determined based on processing a given transmission sensor data instance using the differential model 294A. The transmission-based speed $\dot{\theta}_{tr}$ generated using the differential model 294A can be determined as a function a first angular velocity $\dot{\theta}_l$ of the first front wheel 301 or a second angular velocity $\dot{\theta}_r$ of the second front wheel 302. When vehicle 100 is travelling in a straight direction (i.e., the road-wheel angle of one or more of the wheels of vehicle 100 is zero or within a threshold of zero (e.g., plus or minus 0.5 degrees)), the first angular velocity $\dot{\theta}_l$ of the first front wheel 301 is generally the same as the second angular velocity $\dot{\theta}_r$ of the second front wheel 302. However, when vehicle 100 is turning (i.e., the road-wheel angle of one or more of the wheels of vehicle 100 is non-zero), the first angular velocity $\dot{\theta}_l$ of the first front wheel 301 differs from the second angular velocity $\dot{\theta}_r$ of the second front wheel 302 since a given one of the front wheels 301, 302 has to travel a greater distance in the same amount of time. The angular velocity of the front wheels 301, 302 of the autonomous vehicle can be determined, for example, as a function of one or more of: the rotational velocity of one or more transmission shafts of vehicle 100 included in the instance of the transmission sensor data, a gear ratio of a current gear of the transmission vehicle 100, a radius of each of the front wheels 301, 302 of vehicle 100, or other properties of vehicle 100 stored in one or more databases (e.g., vehicle properties database 124A, 174A of FIGS. 2A and 2B).

In some further versions of those implementations, the transmission-based speed $\dot{\theta}_{tr}$ of vehicle 100 can be an average of the first angular velocity $\dot{\theta}_l$ and the second angular velocity $\dot{\theta}_r$. For example, the first angular velocity $\dot{\theta}_l$ can be determined as a function of a radius of the first front wheel 301, a rotational velocity of the first front axle shaft 381 determined based on the rotational velocity of one or more of the transmission shafts included in the instance of the transmission data, or a gear ratio of a current gear of the transmission of vehicle 100 shafts included in the instance of the transmission data. Further, the second angular velocity $\dot{\theta}_r$ can be determined as a function of a radius of the second front wheel 302, a rotational velocity of the second front axle shaft 382 determined based on the rotational velocity of one or more of the transmission shafts included in the instance of the transmission data, and a gear ratio of a current gear of the transmission of vehicle 100 included in the instance of the transmission data. In other further versions of those implementation, the transmission-based speed $\dot{\theta}_{tr}$ of vehicle 100 can be one of the first angular velocity $\dot{\theta}_l$ or the second angular velocity $\dot{\theta}_r$, or include both of the first angular velocity $\dot{\theta}_l$ or the second angular velocity $\dot{\theta}_r$. For example, the greater of the first angular velocity $\dot{\theta}_l$ and the second angular velocity $\dot{\theta}_r$ can be selected as the transmission-based speed $\dot{\theta}_{tr}$ of vehicle 100 to be utilized in generating the pose instance(s). As another example, both of the first angular velocity $\dot{\theta}_l$ and the second angular velocity $\dot{\theta}_r$ can be selected as the transmission-based speed $\theta_{tr}$ of vehicle 100 to be utilized in generating the pose instance(s).

Moreover, in various implementations, generating the pose instance(s) of vehicle 100 can be further based on an instance of steering sensor data generated by one or more steering sensors 146, 188 of vehicle 100. Notably, the instance of the steering sensor data temporally corresponds to the instance of the transmission sensor data that is also being utilized in generating the pose instance(s). The instance of the steering sensor data can include, for example, an estimated steering angle of vehicle 100, an angle of a steering wheel of vehicle 100, or both. In some versions of those implementations, the pose instance(s) can be generated based on the transmission-based speed of the vehicle 100 (e.g., determined directly or indirectly), and directly based on the instance of the steering sensor data without utilization of the transmission model(s) 294A, 294B, and 294C. For example, a given pose module (e.g., one or both of pose module(s) 252, 292) can process a given instance of transmission sensor data and a temporally corresponding instance of steering sensor data to generate a given pose instance of vehicle 100. In this example, the estimated steering angle of vehicle 100 included in the instance of the steering sensor data can be utilized as a road-wheel angle of one or more wheels of vehicle 100 in generating the pose instance(s).

In some further versions of those implementations, the road-wheel angle can be determined based on one or more properties of vehicle 100. The one or more properties of vehicle can include, for example, at least a steering ratio of vehicle 100. The steering ratio of vehicle 100 can be a ratio of an angle needed for a steering wheel to turn an actual wheel of vehicle 100 one degree. The steering wheel ratio is based on vehicle 100 can vary for different vehicles. For example, if the steering wheel needs to be turned 150 to turn the actual wheel of vehicle 100 by 1°, then the steering wheel ratio is 15:1. Accordingly, if the steering data instance indicates that an angle of the steering wheel of vehicle 100 is 135°, then the road-wheel angle of the actual wheel of vehicle 100 is 9°.

In some additional or alternative versions of those implementations, the pose instance(s) can be generated based on the transmission-based speed of the vehicle 100 (e.g., determined directly or indirectly), and based on steering data. The steering data can be determined based on the instance of the transmission sensor data, the instance of the steering sensor data, an instance of IMU data generated by IMU sensor(s) 140, 182 of vehicle 100, one or more properties of vehicle 100, or any combination thereof. In some versions of those implementations, the aforementioned data can be processed using one or more of the transmission model(s) 294A, 294B, and 294C to determine the steering data to be utilized in generating the pose instance(s). Notably, the instance of the steering sensor data and the instance of the IMU data temporally correspond to the instance of the transmission sensor data also being utilized in generating the pose instance(s). For example, referring specifically to FIG. 3B, a three wheel model 294B of the transmission model(s) 294A, 294B, and 294C is depicted. The three wheel model 294B can include a simulated center wheel 311 (e.g., a simulated front wheel), a first rear wheel 312 (e.g., a left rear wheel), and a second rear wheel 313 (e.g., a right rear wheel). Moreover, a wheelbase w of vehicle 100 can be determined based on a width between the first rear wheel 312 and the second rear wheel 313. Further, a length f of vehicle 100 can be determined based on a distance between a center of the simulated center wheel 311 of vehicle 100 to a center of the rear wheels 312, 313 of vehicle 100. The wheelbase w and the length f of vehicle 100 can be stored in one or more databases that are accessible by the transmission model(s) 294A, 294B, 294C (e.g., vehicle properties database 124A, 174A of FIGS. 2A and 2B). Moreover, a distance d between a center 360 of the three wheel model 294B and the center of the simulated center wheel 311 can also be stored in one or more of the databases.

In some additional or alternative versions of those implementations, an angular velocity of vehicle 100 can be utilized in generating the pose instance(s), and optionally in lieu of, or in addition to, the road-wheel angle δ. The angular velocity of vehicle 100 can be determined based on processing the instance of the transmission sensor data, the instance of the steering sensor data, the instance of the IMU data, or one or more properties of vehicle 100, or any combination thereof. For example, if it is determined that the instance of the transmission sensor data indicates that vehicle 100 is travelling at ten miles per hour as the transmission-based speed $\dot{\theta}_{tr}$ of vehicle 100 and the instance of the steering sensor data indicates that the vehicle is turning at 1°, then it may be determined that, using the three wheel model 294B, vehicle 100 has an angular velocity of three radians per second. As another example, the instance of the IMU data can include accelerometer and gyroscopic measurements of vehicle 100 that indicate vehicle 100 has an angular velocity of four radians per second. In some versions of those implementations, the angular velocity utilized in generating the pose instance(s) can be determined as a function of the angular velocity determined in the manners described in the above examples. For example, the angular velocity utilized in generating the pose instances can be 3.5 radians per second as indicated by an average of both of the angular velocities determined in the above examples.

In some versions of those implementations, a heading rate of the simulated center wheel 311 can be determined based on processing the instance of the IMU data along with the instance of the transmission sensor data or properties of vehicle 100 using the three wheel model 294B. The heading rate can include a rate of change of the road-wheel angle of one or more of the wheels of vehicle 100. For example, the instance of the transmission sensor data can be processed to determine vehicle 100 is travelling at ten miles per hour as the transmission-based speed $\dot{\theta}_{tr}$ of vehicle 100, gyroscopic or accelerometer readings included in the instance of the IMU data can be processed to infer an angular velocity of vehicle 100, and the distance d between the center 360 of the three wheel model 294B and the center of the simulated center wheel 311 can be identified. The heading rate of the simulated center wheel 311 can be determined as a function of the transmission-based speed $\dot{\theta}_{tr}$ of vehicle 100, the inferred angular velocity of vehicle 100 determined in one or more of the manners described above, and the distance d. The heading rate can be compared to the inferred angular velocity to generate feedback. The IMU sensor(s) 140, 182 can utilize the feedback to determine an additive bias associated with the IMU sensor(s) 140, 182. The additive bias can be utilized in generating the pose instance(s) of vehicle 100. For example, the feedback can include an offset of 0.5 radians per second, and this offset may be used in generating the pose instance(s).

As another example, referring specifically to FIG. 3C, a four wheel model 294C is depicted. The four wheel model 294C can include a first front wheel 321 (e.g., a front left wheel), a second front wheel 322 (e.g., a front right wheel), a first rear wheel 323 (e.g., a left rear wheel), and a second rear wheel 324 (e.g., a right rear wheel). Moreover, the four wheel model 294C of vehicle 100 can include the wheelbase w, the length P, and the distance d of vehicle 100 as described above with respect to FIG. 3B. In contrast with the three wheel model 294B of FIG. 3B, the four wheel model 294C of FIG. 3C provides a more accurate representation of vehicle 100 during operation. However, using four wheel model 294C may consume more computational resources than the three model 294B described above with respect to FIG. 3B since the four wheel model 294C includes a fourth wheel of vehicle 100, and a road-wheel angle of the fourth wheel is also determined.

With respect to the four wheel model 294C of FIG. 3C, a first road-wheel angle $\delta_l$, of the first front wheel 321 and a second road-wheel angle $\delta_r$, of the second front wheel 322 can be determined using various geometric techniques. The first road-wheel angle $\delta_l$, of the first front wheel 321 can be determined as a function of the wheelbase w of vehicle 100, the length f of vehicle 100, and a first turning radius of the first front wheel 321. Further, the second road-wheel angle $\delta_r$, of the second front wheel 322 can be determined as a function of the wheelbase w of vehicle 100, the length f of vehicle 100, and a first turning radius of the second front wheel 322. Moreover, it should be noted that the techniques described above with respect to the three wheel model 294B in FIG. 3B can also be utilized to determine the first road-wheel angle $\delta_l$ and the second road-wheel angle $\delta_r$, or an angular velocity of vehicle 100. However, the four wheel model 294C of FIG. 3C is described herein as utilizing various geometric techniques for the sake of example.

Notably, in the four wheel model 294C, the first turning radius of the first front wheel 321 will differ from the second turning radius of the second front wheel 322. This difference is due to one of the front wheels 321, 322 having to travel a further distance in the same amount of time to accomplish the turning action of vehicle 100. For example, as shown in FIG. 3C, the second turning radius of the second front wheel 322 will be larger than the first turning radius of the first front wheel 321 since the vehicle is turning left. As a result, the angular velocity associated with the second front wheel 322 will also be greater than the angular velocity associated with the first front wheel 321 since the second front wheel 322 must traverse the larger second turning radius in the same amount of time that the first front wheel 321 traverses the smaller first turning radius. The first road-wheel angle $\delta_l$ of the first front wheel 321 and a second road-wheel angle $\delta_r$ of the second front wheel 322 can be determined using various geometric techniques based on these turning radii.

As one non-limiting example, given the wheelbase w and the length $ of vehicle 100 are known properties of vehicle 100 (e.g., stored in vehicle properties database 124A, 174A of FIGS. 2A and 2B), assume that there is a first turning radius 391 associated with the first front wheel 321, a second turning radius 392 associated with the second front wheel 322, and a third turning radius 393 extending through the center of the rear wheels 323, 324 that intersect at a turning center O. The turning center O can be inferred based on an angular velocity of vehicle that is determined based on an instance of the transmission sensor data and an instance of the steering sensor data as described above with respect to FIG. 3B, based on an instance of the IMU data as described above with respect to FIG. 3B, or based on both. In this example, the first road-wheel angle $\delta_l$ of the first front wheel 321 can be determined as by applying a trigonometric function to the first turning radius 391 and the length P of vehicle 100. Further, the second road-wheel angle $\delta_r$, of the second front wheel 322 can be determined as by applying a trigonometric function to the second turning radius 392 and the length P of vehicle 100. Although not described with respect to FIG. 3B, the road-wheel angle $\delta$ of vehicle 100 in the three wheel model 294B of FIG. 2B can be determined using these geometric techniques as well.

In some versions of those implementations, both the first road-wheel angle $\delta_l$ of the first front wheel 321 and the second road-wheel angle $\delta_l$ of the second front wheel 322 can be used in generating the pose instance(s) of the pose of vehicle 100. In other versions of those implementations, only of the first road-wheel angle $\delta_l$ of the first front wheel 321 and the second road-wheel angle $\delta_r$, of the second front wheel 322 can be used in generating the pose instance(s) of the pose of vehicle 100. In yet other versions of those implementations, an average of the first road-wheel angle $\delta_l$ f the first front wheel 321 and the second road-wheel angle $\delta_r$, of the second front wheel 322 can be used in generating the pose instance(s) of the pose of vehicle 100.

In various implementations, the road-wheel angle(s) used in generating the local pose instance(s) of the pose of vehicle 100 can include an additive bias. The additive bias of vehicle 100 can evolve stochastically, and can be an offset that is applied to the road-wheel angle or angular velocity of vehicle as described above with respect to FIG. 3B. Moreover, the additive bias can be specific to vehicle 100, and may differ for other autonomous vehicles. In some additional or alternative versions of those implementations, the road-wheel angle(s) used in generating the local pose instance(s) of the pose of vehicle 100 can include added Gaussian noise. By including the additive bias or the Gaussian noise to the road-wheel angle(s) used in generating the pose instance(s) of the pose of vehicle 100, the road-wheel angle(s) can more accurately reflect those of vehicle 100, thereby resulting in pose instance(s) that more accurately reflect an actual pose of vehicle 100. Moreover, it assumed throughout FIGS. 3B and 3C that there is not slip in the wheels of vehicle 100 while vehicle 100 is turning. Although most vehicles have mechanical linkages that nearly eliminate slip, it should be understood that the techniques described herein are robust enough to account for some slip.

Although FIGS. 3B and 3C are described above as using particular manners of determining a transmission-based speed and road-wheel angle of vehicle 100, it should be understood that is for the sake of example and is not meant to be limiting. As one non-limiting example, the road-wheel angle δ of the three wheel model 294B of FIG. 3B can be determined using various geometric techniques discussed in connection with the four wheel model 294C of FIG. 3C. As another non-limiting example, the road-wheel angles $δ_l$, $δ_r$ of the four wheel model 294C of FIG. 3C can be determined using the steering sensor data generated during operation of vehicle 100 discussed in connection with the three wheel model 294B of FIG. 3B. Further, it should be understood that any of the techniques described herein for determining a transmission speed of vehicle 100 can be used by the transmission model(s) 294A, 294B, and 294C of FIGS. 3A-3C. Thus, multiple of the transmission model(s) 294A, 294B, and 294C can be utilized to generate the transmission speed(s) or the steering angle(s) used in generating the pose instance(s). Moreover, it should be noted that the transmission model(s) 294A, 294B, and 294C are described herein as processing various instances of sensor data. It should be understood that the transmission model(s) 294A, 294B, and 294C may be associated with various equations, relationships, or filters that are utilized to process the sensor data.

Figure 4:
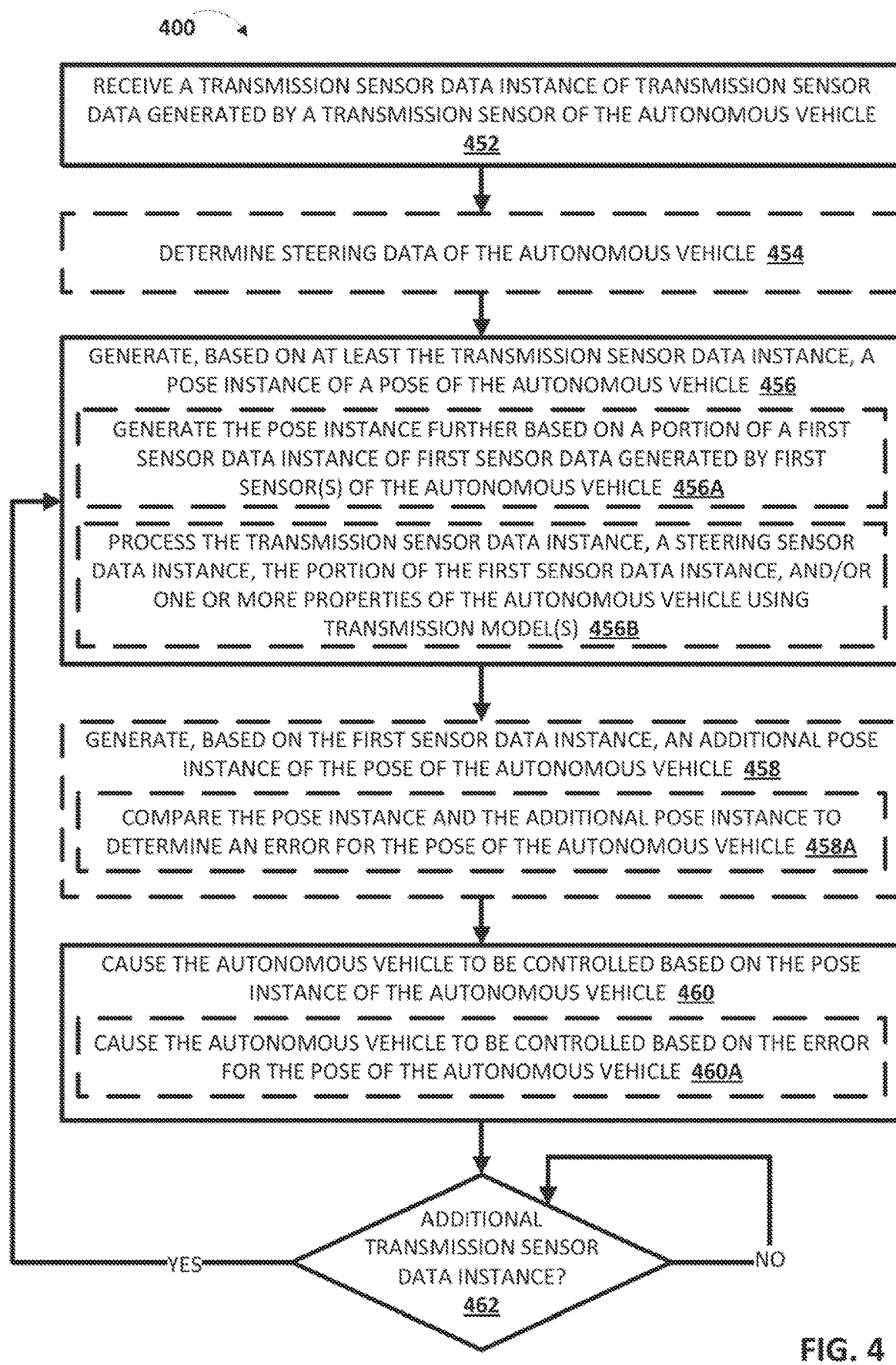
FIG. 4 is flowchart illustrating an example method of using transmission sensor(s) in localization during normal operation of an autonomous vehicle, in accordance with various implementations.

Turning now to FIG. 4, an example method 400 of using transmission sensor(s) in localization during normal operation of an autonomous vehicle is illustrated. The method 400 may be performed by an autonomous vehicle analyzing sensor data generated by sensor(s) of the autonomous vehicle (e.g., vehicle 100 of FIG. 1), by another vehicle (autonomous or otherwise), by another computer system that is separate from the autonomous vehicle, or any combination thereof. For the sake of simplicity, operations of the method 400 are described herein as being performed by a system (e.g., processor(s) 122 or primary vehicle control system 120, processor(s) 172 of secondary vehicle control system 170, or a combination thereof). It will be appreciated that the operations of the method 400 of FIG. 4 may be varied, and that various operations may be performed in parallel or iteratively in some implementations, so the method 400 illustrated in FIG. 4 is merely provided for illustrative purposes.

At block 452, the system receives a transmission sensor data instance of transmission sensor data generated by a transmission sensor of the autonomous vehicle. The transmission sensor can be connected to a transmission of the autonomous vehicle and operably coupled to a front differential of the autonomous vehicle. The transmission sensor data instance can include, for example, a rotational velocity of one or more transmission shafts of the autonomous vehicle, a gear ratio or current gear of the transmission of the autonomous vehicle, or other transmission related data.

In some implementations, the method 400 may include optional block 454. At optional block 454, the system determines steering data of the autonomous vehicle. In some versions of those implementations, the steering data can be a received steering sensor data instance of steering sensor data generated by a steering sensor of the autonomous vehicle. The steering sensor data instance can include, for example, an estimated steering angle of the autonomous vehicle, an angle of a steering wheel of the autonomous vehicle, or both. In some additional or alternative versions of those implementations, the steering data can be a road-wheel angle of one or more wheels of the autonomous vehicle, an angular velocity of the autonomous vehicle, or both. The road-wheel angle of one or more wheels of the autonomous vehicle or the angular velocity of the autonomous vehicle can be determined based on processing the transmission sensor data instance, the steering sensor data instance, an IMU data instance generated by IMU sensor(s) of the autonomous vehicle, one or more properties of the autonomous vehicle, or any combination thereof.

At block 456, the system generates, based on at least the transmission sensor data instance, a pose instance of a pose of the autonomous vehicle. The system can optionally generate the pose instance further based on the steering data. In some implementations of the method 400, block 456 can include optional sub-block 456A. At optional sub-block 456A, the system generates the pose instance further based on a portion of a first sensor data instance of first sensor data generated by first sensor(s) of the autonomous vehicle. The first sensor data instance of the first sensor data temporally corresponds to the transmission sensor data instance. The first sensor data instance can include, for example, IMU data generated by IMU(s) of the autonomous vehicle, wheel encoder data generated by wheel encoder(s) of the autonomous vehicle, other sensor data generated by other sensors of the autonomous vehicle, or any combination thereof. The portion of the first sensor data used in generating the pose instance may be limited to the IMU data generated using the IMU(s) of the autonomous vehicle and exclude the wheel encoder data. In some additional or alternative versions of those implementations of the method 400, block 456 can additionally or alternatively include optional sub-block 456B. At optional sub-block 456B, the system processes the transmission sensor data instance, an instance of steering sensor data instance generated by steering sensor(s) of the autonomous vehicle, an IMU data instance generated by IMU sensor(s) of the autonomous vehicle, one or more properties of the autonomous vehicle using transmission model(s), or any combination thereof. The one or more properties can include, for example, a steering ratio of a steering wheel of the autonomous vehicle, a radius of each of the wheels of the autonomous vehicle, a wheelbase of the autonomous vehicle, a length of the autonomous vehicle, a distance from a center of the autonomous vehicle to a center of a simulated wheel of the autonomous vehicle, other properties of the autonomous vehicle, or any combination thereof. The system can process the data using one or multiple of disparate transmission model(s) as described with respect to FIGS. 3A-3C.

In some implementations, the method 400 can include optional block 458. At optional block 458, the system generates, based on the first sensor data instance, an additional pose instance of the autonomous vehicle. As noted above, the first sensor data instance includes IMU data and wheel encoder data, and the first sensor data instance temporally corresponds to the transmission sensor data instance. Accordingly, the additional pose instance generated at optional block 458 temporally corresponds to the pose instance generated at block 456. In some versions of those implementations of the method 400, optional block 458 can include optional sub-block 458A. At optional sub-block 458A, the system compares the pose instance and the additional pose instance to determine an error for the pose of the autonomous vehicle. In implementations of the method 400 that do not include optional block 458, the system can proceed from block 456 to block 460.

At block 460, the system causes the autonomous vehicle to be controlled based on the pose instance of the autonomous vehicle. In some implementations of the method 400, such as implementation that include optional block 458 and optional sub-block 458A, block 460 can include optional sub-block 460A. At optional sub-block 460A, the system causes the autonomous vehicle to be controlled based on the error for the pose of the autonomous vehicle. In some versions of those implementations, the system can cause the autonomous vehicle to perform a controlled stop of the error satisfies an error threshold. In some other versions of those implementations, the system can cause the autonomous vehicle to continue normal operation if the error does not satisfy the error threshold.

At block 462, the system determines whether an additional transmission sensor data instance is received. If, at an iteration of block 462, the system determines that no additional transmission sensor data instance has been received, then the system can monitor, at block 462, for additional transmission sensor data instances. If, at an iteration of block 462, the system determines that an additional transmission sensor data instance has been received, then the system can return to block 456 to generate a further pose instance to be used in further controlling the autonomous vehicle in accordance with the method 400.

Figure 5:
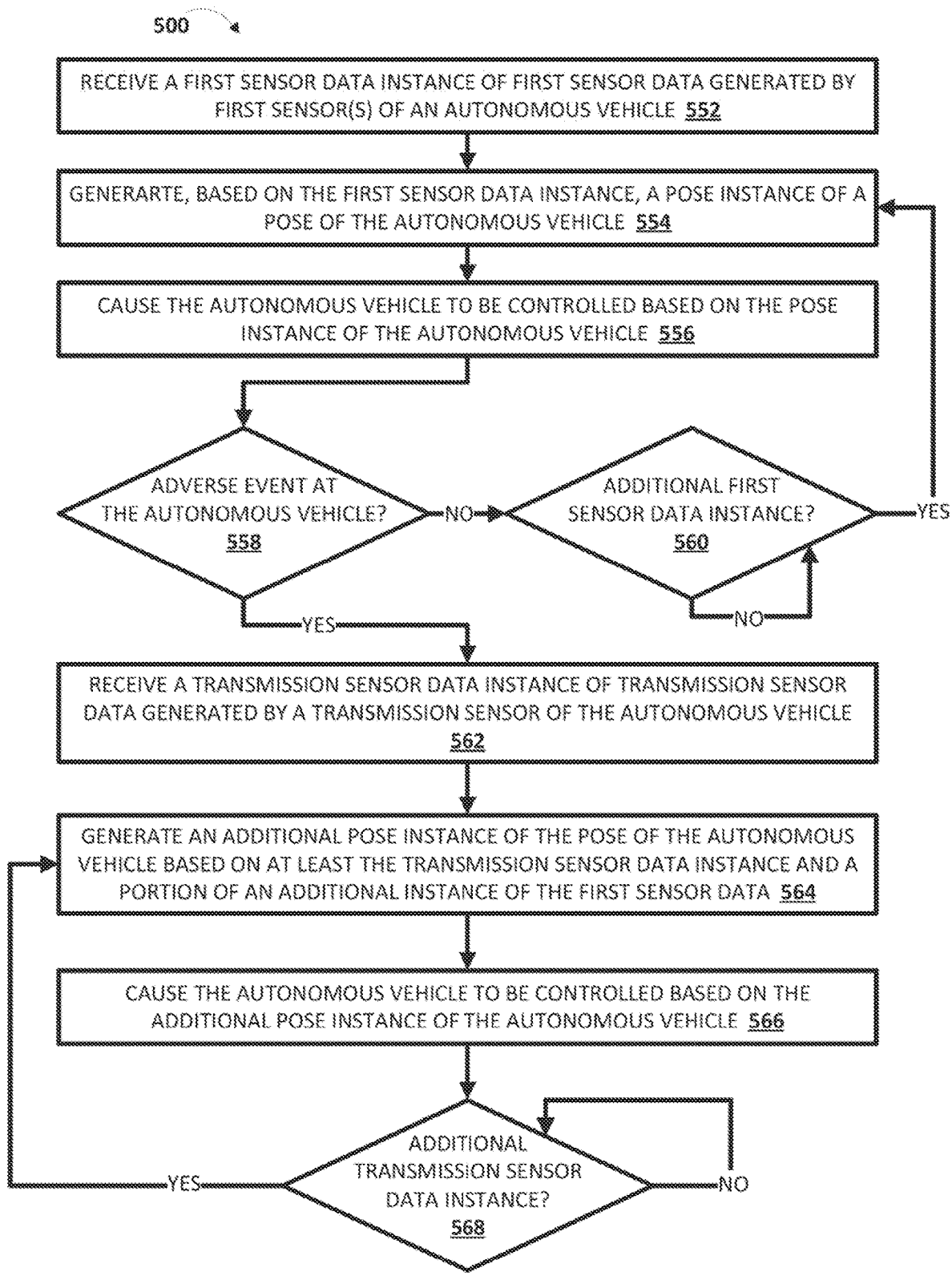
FIG. 5 is flowchart illustrating an example method of using transmission sensor(s) in localization in response to detecting an adverse event at an autonomous vehicle, in accordance with various implementations.

Turning now to FIG. 5, an example method 500 of using transmission sensor(s) in localization in response to detecting an adverse event at an autonomous vehicle is illustrated. The method 500 may be performed by an autonomous vehicle analyzing sensor data generated by sensor(s) of the autonomous vehicle (e.g., vehicle 100 of FIG. 1), by another vehicle (autonomous or otherwise), by another computer system that is separate from the autonomous vehicle, or any combination thereof. For the sake of simplicity, operations of the method 500 are described herein as being performed by a system (e.g., processor(s) 122 or primary vehicle control system 120, processor(s) 172 of secondary vehicle control system 170, or any combination thereof). It will be appreciated that the operations of the method 500 of FIG. 5 may be varied, and that various operations may be performed in parallel or iteratively in some implementations, so the method 500 illustrated in FIG. 5 is merely provided for illustrative purposes.

At block 552, the system receives a first sensor data instance of first sensor data generated by first sensor(s) of an autonomous vehicle. The first sensor data instance can include, for example, an instance of IMU data generated by IMU(s) of the autonomous vehicle, a temporally corresponding instance of wheel encoder data generated by wheel encoder(s) of the autonomous vehicle, other sensor data generated by other sensors of the autonomous vehicle, or any combination thereof. At block 554, the system generates, based on the first sensor data instance, a pose instance of a pose of the autonomous vehicle. At block 556, the system causes the autonomous vehicle to be controlled based on the pose instance of the autonomous vehicle.

At block 558, the system determines whether an adverse event is detected at the autonomous vehicle. Adverse events can include, for example, a detected hardware failure in vehicle control systems, a detected software failure in vehicle control systems, a detected failure of sensor systems, other adverse events, or any combination thereof. If, at an iteration of block 558, the system determines that no adverse event is detected, the system proceeds to block 560. At block 560, the system determines whether an additional first sensor data instance is received. If, at an iteration of block 560, the system determines that no additional first sensor data instance has been received, then the system can monitor, at block 560, for an additional first sensor data instance. If, at an iteration of block 560, the system determines that an additional first sensor data instance has been received, then the system can return to block 554 to generate a further pose instance to be used in further causing the autonomous vehicle to be controlled at a subsequent iteration of block 556. If, at an iteration of block 558, the system determines that an adverse event is detected, the system proceeds to block 562.

At block 562, the system receives a transmission sensor data instance of transmission sensor data generated by a transmission sensor of the autonomous vehicle. The transmission sensor can be connected to a transmission of the autonomous vehicle and operably coupled to a front differential of the autonomous vehicle. The transmission sensor data instance can include, for example, a rotational velocity of one or more transmission shafts of the autonomous vehicle, a gear ratio or current gear of the transmission of the autonomous vehicle, other transmission related data, or any combination thereof.

At block 564, the system generates an additional pose instance of the pose of the autonomous vehicle based on at least the transmission sensor data instance and a portion of an additional instance of the first sensor data. The portion of the additional instance of the first sensor data includes at least an additional instance of the IMU data. For example, assume the adverse event detected at the autonomous vehicle is detecting a failure of the wheel encoder sensors of the autonomous vehicle. In this example, the portion of the additional instance of the first sensor data will include the IMU data, but not any wheel encoder data. In some implementations, the system may further generate the additional pose instance based on an instance of steering sensor data generated by a steering sensor of the autonomous vehicle, properties of the autonomous vehicle, or any combination thereof. The steering sensor data instance can include, for example, an estimated steering angle of the autonomous vehicle, an angle of a steering wheel of the autonomous vehicle, other steering relates measures, or any combination thereof. The one or more properties can include, for example, a steering ratio of a steering wheel of the autonomous vehicle, a radius of each of the wheels of the autonomous vehicle, a wheelbase of the autonomous vehicle, a length of the autonomous vehicle, a distance from a center of the autonomous vehicle to a center of a simulated wheel of the autonomous vehicle, other properties of the autonomous vehicle, or any combination thereof. Moreover, in various implementations, the system can process the above sensor data using one or more transmission models as described above with respect to FIGS. 3A-3C.

At block 566, the system causes the autonomous vehicle to be controlled based on the additional pose instance of the autonomous vehicle. In some implementations, the autonomous vehicle is controlled based on the adverse event that is detected at block 558. For example, if the adverse event detected at block 558 is a power failure of primary vehicle control system of the autonomous vehicle, then the additional pose instance can be utilized in performing a controlled stop of the autonomous vehicle. As another example, if the adverse event detected at block 558 is a sensor failure of wheel encoder sensor(s) of the autonomous vehicle, then additional pose instance can be utilized in continuing normal operation of the autonomous vehicle.

At block 568, the system determines whether an additional transmission sensor data instance is received. If, at an iteration of block 568, the system determines that no additional transmission sensor data instance has been received, then the system can monitor, at block 568, for additional transmission sensor data instances. If, at an iteration of block 568, the system determines that an additional transmission sensor data instance has been received, then the system can return to block 564 to generate a further pose instance to be used in further controlling the autonomous vehicle in accordance with the method 500.

Although the operations of FIGS. 4 and 5 are depicted in a particular order, it should be understood that is for the sake of example and not meant to be limiting. Moreover, it should be appreciated that the operations of FIGS. 4 and 5 can be performed in parallel or redundantly. As one non-limiting example, the operations of FIGS. 4 and 5 can be performed simultaneously using both localization subsystem 152 of primary vehicle control system 120 of vehicle 100 and localization subsystem 192 of secondary vehicle control system 170 of FIG. 1. Moreover, the techniques described herein can utilize this split architecture to operate the autonomous vehicle in both normal operation or in scenarios when an adverse event is detected at primary vehicle control system 120 or secondary vehicle control system 170 of FIG. 1. Moreover, various operations described in FIGS. 4 and 5 are described in greater detail herein (e.g., with respect to FIGS. 2A, 2B, and 3A-3C).

Moreover, it should also be understood that the operations of FIGS. 4 and 5 can be performed by a remote computing system (e.g., server-based or cloud-based implementations). For example, the sensor data generated by the autonomous vehicle can be transmitted to the remote computing system over one or more networks, and the remote computing system can process the sensor data and transmit information back to the autonomous vehicle over one or more of the networks. For instance, the autonomous vehicle can transmit the sensor data to the remote computing system, the remote computing system can process the sensor data, and the remote computing system can transmit the pose instance back to the autonomous vehicle. As another example, the remote computing system can send one or more control commands to the autonomous vehicle based on the pose instance of the autonomous vehicle.

Other variations will be apparent to those of ordinary skill. Therefore, the invention lies in the claims hereinafter appended.

What is claimed is:

1. A method for localization of an autonomous vehicle (AV), the method comprising:
   receiving a transmission sensor data instance generated by a transmission sensor of the AV;
   determining steering data of the AV that indicates a steering angle of the AV, and that temporally corresponds to the transmission sensor data instance, wherein determining the steering data of the AV comprises:
      receiving, from a steering sensor of the AV, a steering sensor data instance generated by the steering sensor of the AV;
      processing, using a transmission model, the transmission sensor data instance and the steering sensor data instance, along with one or more properties of the AV, to generate output that indicates a road-wheel angle of a simulated center wheel of the AV; and
      using the road-wheel angle of the simulated center wheel of the AV as the steering data of the AV;
   generating, based on the transmission sensor data instance and based on the steering data of the AV that temporally corresponds to the transmission sensor data instance, a pose instance of a pose of the AV; and
   causing the AV to be controlled based on the pose instance of the AV.

2. The method of claim 1, further comprising:
   detecting an adverse event at the AV,
      wherein causing the AV to be controlled based on the pose instance of the AV, that is generated based on the transmission sensor data instance, is in response to detecting the adverse event at the AV.

3. The method of claim 2, wherein detecting the adverse event comprises detecting that one or more wheel encoders of the AV have failed.

4. The method of claim 2, wherein causing the AV to be controlled based on the pose instance of the AV comprises causing the AV to perform a controlled stop based on the pose instance of the AV.

5. The method of claim 2, further comprising:
   prior to detecting the adverse event at the AV:
   receiving a first sensor data instance generated by one or more first sensors of the AV, wherein the one or more first sensors of the AV do not include the transmission sensor;
   generating, based on the first sensor data instance, a prior pose instance of the pose of the AV; and
   causing the AV to be controlled based on the prior pose instance of the AV.

6. The method of claim 1, further comprising
   comparing the pose instance to an additional pose instance of the pose of the AV, wherein the additional pose instance is generated based on an IMU data instance generated by one or more IMUs of the AV and a wheel encoder data instance generated by one or more wheel encoders of the AV, and wherein both the IMU data instance and the wheel encoder data instance temporally correspond to the transmission sensor data instance;
   determining, based on the comparing, an error in the additional pose instance; and
   wherein causing the AV to be controlled based on the pose instance of the AV is in response to determining the error in the additional pose instance satisfies an error threshold.

7. An autonomous vehicle (AV) control system comprising:
   at least one processor; and
   at least one memory storing instructions that are operable, when executed by the at least one processor, cause the at least one processor to perform operations comprising:
      receiving a transmission sensor data instance generated by a transmission sensor of the AV;
      determining steering data of the AV that indicates a steering angle of the AV, and that temporally corresponds to the transmission sensor data instance, wherein determining the steering data of the AV comprises:
         receiving, from one or more IMUs of the AV, an IMU data instance generated by one or more of the IMUs of the AV;
         processing, using a transmission model, the transmission sensor data instance and the IMU data instance, along with one or more properties of the AV, to generate output that indicates a road-wheel angle of a simulated center wheel of the AV; and using the road-wheel angle of the simulated center wheel of the AV as the steering data of the AV;

generating, based on the transmission sensor data instance and based on the steering data of the AV that temporally corresponds to the transmission sensor data instance, a pose instance of a pose of the AV; and causing the AV to be controlled based on the pose instance of the AV.

8. The AV control system of claim 7, wherein the operations further comprise:

detecting an adverse event at the AV,
wherein causing the AV to be controlled based on the pose instance of the AV, that is generated based on the transmission sensor data instance, is in response to detecting the adverse event at the AV.

9. The AV control system of claim 8, wherein detecting the adverse event comprises detecting that one or more wheel encoders of the AV have failed.

10. The AV control system of claim 8, wherein causing the AV to be controlled based on the pose instance of the AV comprises causing the AV to perform a controlled stop based on the pose instance of the AV.

11. The AV control system of claim 8, wherein the operations further comprise:

prior to detecting the adverse event at the AV:
receiving a first sensor data instance generated by one or more first sensors of the AV, wherein the one or more first sensors of the AV do not include the transmission sensor;
generating, based on the first sensor data instance, a prior pose instance of the pose of the AV; and
causing the AV to be controlled based on the prior pose instance of the AV.

12. An autonomous vehicle (AV) comprising:

one or more sensors;
at least one processor; and
at least one memory storing instructions that are operable, when executed by the at least one processor, cause the at least one processor to perform operations comprising:
receiving, from a first sensor of the one or more sensors, a transmission sensor data instance generated by the first sensor of the AV;
determining steering data of the AV that indicates a steering angle of the AV, and that temporally corresponds to the transmission sensor data instance, wherein determining the steering data of the AV comprises:
receiving, from one or more IMUs of the AV, an IMU data instance generated by one or more of the IMUs of the AV;
processing, using a transmission model, the transmission sensor data instance and the IMU data instance, along with one or more properties of the AV, to generate output that indicates a first road-wheel angle of a first front wheel of the AV and a second road-wheel angle of a second front wheel of the AV; and
using the first road-wheel angle of the first front wheel of the AV and the second road-wheel angle of the second front wheel of the AV as the steering data of the AV;
generating, based on the transmission sensor data instance and based on the steering data of the AV that temporally corresponds to the transmission sensor data instance, a pose instance of a pose of the AV; and
causing the AV to be controlled based on the pose instance of the AV.

13. The AV of claim 12, wherein the operations further comprise:

detecting an adverse event at the AV,
wherein causing the AV to be controlled based on the pose instance of the AV, that is generated based on the transmission sensor data instance, is in response to detecting the adverse event at the AV.

14. The AV of claim 13, wherein the operations further comprise:

prior to detecting the adverse event at the AV:
receiving a first sensor data instance generated by one or more first sensors of the AV, wherein the one or more first sensors of the AV do not include the transmission sensor;
generating, based on the first sensor data instance, a prior pose instance of the pose of the AV; and
causing the AV to be controlled based on the prior pose instance of the AV.

* * * * *